(12) United States Patent
Sato et al.

(10) Patent No.: US 12,070,963 B2
(45) Date of Patent: Aug. 27, 2024

(54) IMAGE RECORDED MATERIAL AND METHOD OF PRODUCING SAME, AND LAMINATE AND METHOD OF PRODUCING SAME

(71) Applicant: FUJIFILM Corporation, Tokyo (JP)

(72) Inventors: Ayato Sato, Ashigarakami-gun (JP); Masaharu Kawai, Ashigarakami-gun (JP); Takeshi Miyato, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/713,294

(22) Filed: Apr. 5, 2022

(65) Prior Publication Data

US 2022/0227154 A1    Jul. 21, 2022

Related U.S. Application Data

(63) Continuation of application No. PCT/JP2020/035359, filed on Sep. 17, 2020.

(30) Foreign Application Priority Data

Oct. 29, 2019 (JP) .................................. 2019-196721

(51) Int. Cl.
| | |
|---|---|
| *B41M 5/00* | (2006.01) |
| *B32B 38/00* | (2006.01) |
| *C09D 11/033* | (2014.01) |
| *C09D 11/037* | (2014.01) |
| *C09D 11/107* | (2014.01) |
| *C09D 11/322* | (2014.01) |
| *C09D 11/38* | (2014.01) |
| *C09D 11/54* | (2014.01) |

(52) U.S. Cl.
CPC ......... *B41M 5/0023* (2013.01); *B32B 38/145* (2013.01); *B41M 5/0011* (2013.01); *C09D 11/033* (2013.01); *C09D 11/037* (2013.01); *C09D 11/107* (2013.01); *C09D 11/322* (2013.01); *C09D 11/38* (2013.01); *C09D 11/54* (2013.01)

(58) Field of Classification Search
CPC . B32B 38/145; B41M 5/0011; B41M 5/0023; C09D 11/033; C09D 11/037; C09D 11/107; C09D 11/322; C09D 11/38; C09D 11/54
See application file for complete search history.

(56) References Cited

U.S. PATENT DOCUMENTS

| | | |
|---|---|---|
| 2010/0181753 A1 | 7/2010 | Magnin et al. |
| 2012/0176455 A1 | 7/2012 | Ohta et al. |
| 2012/0200651 A1 | 8/2012 | Sasada et al. |
| 2015/0328904 A1 | 11/2015 | Yano |
| 2018/0257104 A1 | 9/2018 | Che et al. |
| 2018/0281492 A1 | 10/2018 | Matsuzaki et al. |
| 2019/0100048 A1 | 4/2019 | Ohta |
| 2019/0283464 A1 | 9/2019 | Matsuzaki |
| 2019/0284427 A1 | 9/2019 | Matsuzaki et al. |
| 2020/0216703 A1 | 7/2020 | Fujii et al. |
| 2020/0376877 A1 | 12/2020 | Shirokane et al. |

FOREIGN PATENT DOCUMENTS

| | | | |
|---|---|---|---|
| CN | 102211452 A | 10/2011 | |
| CN | 108290432 A | 7/2018 | |
| JP | 2007-125855 A | 5/2007 | |
| JP | 2007-331171 A | 12/2007 | |
| JP | 2013-107224 A | 6/2013 | |
| JP | 2015-180710 A | 10/2015 | |
| JP | 2015-217591 A | 12/2015 | |
| JP | 2017-125158 A | 7/2017 | |
| JP | 2017-222143 A | 12/2017 | |
| JP | 2018-165029 A | 10/2018 | |
| JP | 2019-064087 A | 4/2019 | |
| JP | 2019-156995 A | 9/2019 | |
| JP | 2019-162841 A | 9/2019 | |
| WO | WO-2009065502 A1 * | 5/2009 | ............ B32B 23/08 |
| WO | 2019/064978 A1 | 4/2019 | |
| WO | 2019/188852 A1 | 10/2019 | |

OTHER PUBLICATIONS

Extended European Search Report dated Nov. 24, 2022 in Application No. 20880855.0.
Chinese Office Action dated Dec. 2, 2022 in Chinese Application No. 202080073384.3.
Written Opinion dated Dec. 8, 2020 issued by the International Searching Authority in Application No. PCT/JP2020/035359.
International Search Report dated Dec. 8, 2020 issued by the International Searching Authority in Application No. PCT/JP2020/035359.

(Continued)

*Primary Examiner* — Christopher M Polley
*Assistant Examiner* — Sathavaram I Reddy
(74) *Attorney, Agent, or Firm* — Sughrue Mion, PLLC

(57) ABSTRACT

A method of producing an image recorded material is a method including an image recording of sequentially applying a pretreatment liquid containing an aggregating agent, a first ink containing a first resin, and a second ink containing a second resin onto an impermeable base material to record an image, in which in the image recording, the image is recorded under a condition in which a ratio of a total applied mass of the first resin and the second resin per unit area to an applied mass of the aggregating agent per unit area in an overlapping region formed such that a region where the pretreatment liquid is applied, a region where the first ink is applied, and a region where the second ink is applied overlap each other in plan view is generated is 16.0 or greater and 30.0 or less.

7 Claims, No Drawings

(56) References Cited

OTHER PUBLICATIONS

International Prliminary Report on Patentability dated May 3, 2022 with a Translation of the Written Opinion of the International Searching Authority in Application No. PCT/JP2020/035359.
European Office Action dated Jun. 21, 2023 in European Application No. 20880855.0.
Chinese Office Action dated Jun. 30, 2023 in Chinese Application No. 202080073384.3.
Japanese Office Action dated May 16, 2023 in Japanese Application No. 2021-554170.
Japanese Office Action dated Sep. 12, 2023 in Japanese Application No. 2021-554170.
Communication dated Jan. 23, 2024, issued in Japanese Application No. 2021-554170.
Japanese Office Action dated Oct. 31, 2023 in Application No. 2021-554170.

* cited by examiner

US 12,070,963 B2

IMAGE RECORDED MATERIAL AND METHOD OF PRODUCING SAME, AND LAMINATE AND METHOD OF PRODUCING SAME

CROSS-REFERENCE TO RELATED APPLICATIONS

This application is a Continuation of PCT International Application No. PCT/JP2020/035359 filed on Sep. 17, 2020, which claims priority under 35 U.S.C. § 119(a) to Japanese Patent Application No. 2019-196721 filed on Oct. 29, 2019. Each of the above application(s) is hereby expressly incorporated by reference, in its entirety, into the present application.

BACKGROUND OF THE INVENTION

1. Field of the Invention

The present disclosure relates to an image recorded material and a method of producing the same, and a laminate and a method of producing the same.

2. Description of the Related Art

In recent years, a technique for recording an image using an ink and a pretreatment liquid (also referred to as a reaction liquid or the like) containing an aggregating agent that aggregates components in the ink has been examined.

For example, JP2015-217591A discloses, as an ink jet recording method of reducing an odor of a reactant and obtaining a high-quality image recorded material, an ink jet recording method including a recording step of adhering a reaction liquid and one or more kinds of inkjet ink compositions to a low-absorptive or non-absorptive recording medium, in which the reaction liquid contains a reactant that is a carboxylic acid or a carboxylate reacting with components of the inkjet ink composition, the inkjet ink composition contains a resin and water, and the reaction liquid and the inkjet ink composition are adhered to the recording medium in the adhesion region where the adhesion amount of the resin is 20% or greater and 100% or less such that the mass ratio (resin/reactant) of the adhesion amount of the resin to the adhesion amount of the reactant is set to 1.5 or greater and 16 or less in a case where the adhesion amount of the region where the adhesion amount of the resin is the greatest per unit area is set to 100%, in the adhesion region of the inkjet ink composition onto the low-absorptive or non-absorptive recording medium.

Further, JP2018-165029A discloses, as an ink jet recording method of obtaining a recorded material excellent in image quality and rub resistance, an ink jet recording method including a reaction liquid adhesion step of adhering a reaction liquid containing an aggregating agent that aggregates components in an aqueous ink composition to a recording region of a recording medium, and an ink composition adhesion step of jetting the aqueous ink composition that contains a pigment dispersion containing a surface treatment pigment and water from an ink jet head to be adhered to the recording region of the recording medium, in which the recording region has a region where the adhesion amount of the aqueous ink composition is 2 times or greater and 20 times or less the adhesion amount of the reaction liquid.

SUMMARY OF THE INVENTION

However, an image is recorded on an impermeable base material to obtain an image recorded material, and a base material for lamination is laminated on the image in the image recorded material in some cases. In this case, the lamination strength between the image recorded material and the base material for lamination is required to be improved.

An object of one aspect of the present disclosure is to provide an image recorded material which includes an impermeable base material and an image recorded on the impermeable base material and has excellent lamination strength in a case where a base material for lamination is laminated on the image, and a method of producing an image recorded material, which enables production of the image recorded material.

Another object of the present disclosure is to provide a laminate which includes the image recorded material and a base material for lamination laminated on the image of the image recorded material and has excellent lamination strength of the image and the base material for lamination, and a method of producing a laminate which enables production of the laminate.

Specific means for achieving the above-described objects includes the following aspects.

<1> A method of producing an image recorded material, comprising: a step of preparing a pretreatment liquid containing at least one aggregating agent selected from the group consisting of an organic acid, an organic acid salt, a polyvalent metal compound, and a metal complex, and water; a step of preparing a first ink containing a first pigment, a first resin, and water; a step of preparing a second ink containing a second pigment, a second resin, and water and having a surface tension less than a surface tension of the first ink; and an image recording step of sequentially applying the pretreatment liquid, the first ink, and the second ink onto an impermeable base material to record an image, in which in the image recording step, the image is recorded under a condition in which an overlapping region formed such that a region where the pretreatment liquid is applied, a region where the first ink is applied, and a region where the second ink is applied overlap each other in plan view is generated and in which a ratio of a total applied mass of the first resin and the second resin per unit area to an applied mass of the aggregating agent per unit area in the overlapping region is 16.0 or greater and 30.0 or less.

<2> The method of producing an image recorded material according to <1>, in which the ratio is 16.0 or greater and 25.0 or less.

<3> The method of producing an image recorded material according to <1> of <2>, in which, in a case of the first ink, a content of an organic solvent having a boiling point of 220° C. or higher is 5% by mass or less with respect to a total amount of the first ink, and in a case of the second ink, a content of the organic solvent having a boiling point of 220° C. or higher is 5% by mass or less with respect to a total amount of the second ink.

<4> The method of producing an image recorded material according to any one of <1> to <3>, in which the pretreatment liquid contains a resin, the first resin contains resin particles, and the resin contained in the pretreatment liquid has a glass transition temperature lower than a glass transition temperature of the resin particles contained in the first resin.

<5> The method of producing an image recorded material according to any one of <1> to <4>, in which the first resin contains resin particles, the second resin contains resin particles, and in a case where among the resin particles contained in the first resin and the resin particles contained in the second resin, in the overlapping region, a glass transition temperature of the resin particles with a greater applied mass per unit area is defined as Ta and a glass transition temperature of the resin particles with a smaller applied mass per unit area is defined as Tb, Ta and Tb satisfy a relationship of 0° C.≤Ta−Tb≤30° C.

<6> The method of producing an image recorded material according to any one of <1> to <3>, in which in a case where a viscosity of a mixture obtained by mixing the pretreatment liquid and the first ink is defined as A1 and a viscosity of a mixture obtained by mixing the pretreatment liquid and the second ink is defined as A2, A1 and A2 satisfy a relationship of A1−A2>0 mPa·s.

<7> A method of producing a laminate, comprising: a step of obtaining an image recorded material by the method of producing an image recorded material according to any one of <1> to <6>; and a step of laminating a base material for lamination on a side where an image of the image recorded material is recorded to obtain a laminate.

<8> An image recorded material comprising: an impermeable base material; and an image recorded on the impermeable base material, in which the image includes a pretreatment layer that is in contact with the impermeable base material and contains an aggregating agent, a first layer that is in contact with the pretreatment layer and contains a first pigment and a first resin, and a second layer that is in contact with the first layer and contains a second pigment and a second resin and also includes an overlapping region where the pretreatment layer, the first layer, and the second layer overlap each other in plan view, the aggregating agent is at least one selected from the group consisting of an organic acid, an organic acid salt, a polyvalent metal compound, and a metal complex, and a ratio of a total mass of the first resin and the second resin per unit area to a mass of the aggregating agent per unit area in the overlapping region is 16.0 or greater and 30.0 or less.

<9> A laminate comprising: the image recorded material according to <8>; and a base material for lamination which is laminated on the image of the image recorded material.

According to one aspect of the present disclosure, it is possible to provide an image recorded material which includes an impermeable base material and an image recorded on the impermeable base material and has excellent lamination strength in a case where a base material for lamination is laminated on the image, and a method of producing an image recorded material, which enables production of the image recorded material.

According to another aspect of the present disclosure, it is possible to provide a laminate which includes the image recorded material and a base material for lamination laminated on the image of the image recorded material and has excellent lamination strength of the image and the base material for lamination, and a method of producing a laminate which enables production of the laminate.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

Further, in the present disclosure, "image" indicates an entire film to be formed by sequentially applying a pretreatment liquid, a first ink, and a second ink onto an impermeable base material, and "recording of an image" and "image recording" respectively indicate formation of a film and film formation.

Further, the concept of "image" in the present disclosure also includes a solid image.

Method of Producing Image Recorded Material

A method of producing an image recorded material of the present disclosure is a method including a step of preparing a pretreatment liquid containing at least one aggregating agent selected from the group consisting of an organic acid, an organic acid salt, a polyvalent metal compound, and a metal complex, and water, a step of preparing a first ink containing a first pigment, a first resin, and water, a step of preparing a second ink containing a second pigment, a second resin, and water and having a surface tension less than a surface tension of the first ink, and an image recording step of sequentially applying the pretreatment liquid, the first ink, and the second ink onto an impermeable base material to record an image, in which in the image recording step, the image is recorded under a condition in which an overlapping region formed such that a region where the pretreatment liquid is applied, a region where the first ink is applied, and a region where the second ink is applied overlap each other in plan view is generated and in which a ratio of a total applied mass of the first resin and the second resin per unit area to an applied mass of the aggregating agent per unit area (hereinafter, also referred to as "applied mass ratio [(first resin+second resin)/aggregating agent]" or "applied amount ratio [resin/aggregating agent]") in the overlapping region is 16.0 or greater and 30.0 or less.

According to the method of producing an image recorded material of the present disclosure, an image recorded material including an impermeable base material and an image recorded on the impermeable base material and having excellent lamination strength in a case where a base material for lamination is laminated on the image can be produced.

Here, the lamination strength denotes peeling strength in a case of peeling the base material for lamination and the image recorded material from the laminate formed by lamination [that is, the laminate having a laminated structure of "the base material for lamination/the image recorded material" (specifically, a laminated structure of "the base material for lamination/the image/the impermeable base material")].

The reason why the above-described effect is exhibited by the method of producing an image recorded material of the present disclosure is assumed as follows.

In order to improve the lamination strength in the laminate, it is necessary to improve the adhesiveness between the impermeable base material and the image and to improve the adhesiveness between the image and the base material for lamination as a premise.

In the image recording step in the method of producing an image recorded material of the present disclosure, the pretreatment liquid, the first ink, and the second ink are sequentially applied onto the impermeable base material. That is, the pretreatment liquid is applied onto the impermeable base material, the first ink is applied onto the applied pretreatment liquid, and the second ink is applied onto the applied first ink. The pretreatment liquid, the first ink, and the second ink are applied under a condition (that is, application disposition) in which an overlapping region formed such that a region where the pretreatment liquid is applied, a region where the first ink is applied, and a region where the second ink is applied overlap each other in plan view. In this manner, the components (mainly the first resin) in the first ink and the components (mainly the second resin) in the second ink which are applied onto the pretreatment liquid are aggregated by an action of the aggregating agent that is a component in the pretreatment liquid, and thus an image is obtained on the impermeable base material.

Here, it is considered that in a case where the applied mass ratio [(first resin+second resin)/aggregating agent] in the overlapping region is 30.0 or less, insufficient aggregation of the first resin and the second resin is suppressed, and thus a decrease in adhesiveness between the impermeable base material and the image due to insufficient aggregation is suppressed.

Further, it is considered that in a case where the applied mass ratio [(first resin+second resin)/aggregating agent] in the overlapping region is 16.0 or greater, overaggregation of the first resin and the second resin is suppressed, and thus unevenness of the surface of the image and/or variation in thickness of the image due to overaggregation is suppressed. As a result, it is considered that the decrease in adhesiveness between the image and the base material for lamination due to the unevenness of the surface of the image and/or variation in thickness of the image is suppressed.

Further, since the surface tension of the second ink is less than the surface tension of the first ink, the wet spreadability of the second ink on the first ink is improved in the overlapping region, and as a result, the unevenness of the surface of the image and the variation in thickness of the image is suppressed. As a result, it is considered that the decrease in adhesiveness between the image and the base material for lamination due to the unevenness of the surface of the image and/or variation in thickness of the image is suppressed.

As described above, it is considered that in the method of producing an image recorded material of the present disclosure, the adhesiveness between the impermeable base material and the image is ensured, the adhesiveness between the image and the base material for lamination is also ensured, and as a result, the lamination strength is ensured.

Hereinafter, each step that can be included in the method of producing an image recorded material of the present disclosure will be described.

Step of Preparing Pretreatment Liquid

The step of preparing a pretreatment liquid (hereinafter, also referred to as "pretreatment liquid preparation step") is a step of preparing a pretreatment liquid containing at least one aggregating agent selected from the group consisting of an organic acid, an organic acid salt, a polyvalent metal compound, and a metal complex, and water.

The pretreatment liquid preparation step may be a step of simply preparing a pretreatment liquid that has been produced in advance or a step of producing a pretreatment liquid.

The method of producing a pretreatment liquid is not particularly limited, and a known method of mixing components can be employed.

Water

The pretreatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less with respect to the total amount of the pretreatment liquid.

Aggregating Agent

A pretreatment liquid containing at least one aggregating agent selected from the group consisting of an organic acid, an organic acid salt, a polyvalent metal compound, and a metal complex is prepared as the pretreatment liquid.

The aggregating agent is a component that aggregates components (for example, the first resin and the second resin) in the ink (that is, a first ink and a second ink, the same applies hereinafter).

Organic Acid

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, adipic acid, pimelic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as a polyvalent carboxylic acid) is preferable.

As the polyvalent carboxylic acid, a dicarboxylic acid or a tricarboxylic acid is preferable, glutaric acid, malonic acid, succinic acid, adipic acid, pimelic acid, malic acid, maleic acid, fumaric acid, tartaric acid, or citric acid is still more preferable, glutaric acid, malonic acid, succinic acid, adipic acid, pimelic acid, malic acid, fumaric acid, tartaric acid, or citric acid is still more preferable, and glutaric acid, malonic acid, succinic acid, adipic acid, or pimelic acid is even still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

Organic Acid Salt

Examples of the organic acid salt include salts of organic acids exemplified above.

Examples of the organic acid salt include alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the organic acid salt, an organic acid salt containing an alkaline earth metal is preferable, an organic acid salt containing calcium (such as calcium lactate or calcium acetate), or an organic acid salt containing magnesium (such as magnesium lactate or magnesium acetate) is preferable.

Polyvalent Metal Compound

Examples of the polyvalent metal compound include a salt (here, excluding the organic acid salt) containing at least one selected from the group consisting of alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the polyvalent metal compound, a nitrate, a chloride, or a thiocyanate is suitable.

As the polyvalent metal compound, a calcium salt or a magnesium salt of nitric acid, calcium chloride, magnesium chloride, or a calcium salt or a magnesium salt of thiocyanic acid is particularly preferable.

Further, it is preferable that at least a part of the polyvalent metal compound is dissociated into polyvalent metal ions and counter ions in the pretreatment liquid.

Metal Complex

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

Resin

It is preferable that the pretreatment liquid contains at least one resin.

In a case where the pretreatment liquid contains a resin, the adhesiveness of the image is further improved.

In the case where the pretreatment liquid contains a resin, the glass transition temperature (Tg) of the resin contained in the pretreatment liquid is preferably 0° C. or higher, more preferably 10° C. or higher, still more preferably 20° C. or higher, and even still more preferably 30° C. or higher.

In the case where the pretreatment liquid contains a resin, the glass transition temperature (Tg) of the resin contained in the pretreatment liquid is preferably 120° C. or lower, more preferably 100° C. or lower, still more preferably 80° C. or lower, and even still more preferably 70° C. or lower.

In the present disclosure, the glass transition temperature of the resin indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin is maintained at a temperature lower than the expected glass transition temperature of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present specification is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the pretreatment liquid contains two or more kinds of resins, the glass transition temperature (Tg) of the resins in the pretreatment liquid indicates the weighted average value of the glass transition temperatures of the respective resins.

Examples of the resin that may be contained in the pretreatment liquid include an acrylic resin, a polyester resin, a polyolefin resin, a polyurethane resin, a polyurea resin, a polyamide resin, a polycarbonate resin, and a polystyrene resin.

The resins that can be contained in the pretreatment liquid include preferably a polyester resin or an acrylic resin and more preferably a polyester resin.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

In the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

In the present disclosure, the polyolefin resin indicates a polymer (a homopolymer or a copolymer) of a raw material monomer containing an olefin. Examples of the polyolefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

In the present disclosure, the polyurethane resin indicates a polymer compound having a urethane bond.

In the present disclosure, the polyurea resin indicates a polymer compound having a urea bond.

In the present disclosure, the polyamide resin indicates a polymer compound having an amide bond.

In the present disclosure, the polycarbonate resin indicates a polymer compound having a carbonate bond.

In the present disclosure, the polystyrene resin indicates a polymer of a raw material monomer containing styrene.

The resin that can be contained in the pretreatment liquid may be a water-soluble resin or a water-insoluble resin, but a water-insoluble resin is preferable.

In the present disclosure, the term "water-soluble" indicates a property in which 1 g or greater of a substance is dissolved in 100 g of water at 25° C. As the "water-soluble" property, a property in which 3 g or greater (more preferably 10 g or greater) of a substance is dissolved in 100 g of water at 25° C. is preferable.

In the present disclosure, the term "water-insoluble" indicates a property in which less than 1 g of a substance is dissolved in 100 g of water at 25° C. As the "water-insoluble" property, a property in which less than 0.5 g of a substance is dissolved in 100 g of water at 25° C. is preferable.

It is preferable that the pretreatment liquid contains resin particles.

It is preferable that the resin particles consist of a water-insoluble resin.

Further, acrylic resin particles, polyester resin particles, a mixture of acrylic resin particles and polyester resin particles, or composite particles containing an acrylic resin and a polyester resin are preferable as the resin particles.

The resin particles that can be contained in the first ink, which will be described below in the section of "step of preparing first ink" are also preferable as the resin particles.

The weight-average molecular weight (Mw) of the resin in the resin particles is preferably in a range of 1000 to 300000, more preferably in a range of 2000 to 200000, and still more preferably in a range of 5000 to 100000.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μL, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The volume average particle diameter of the resin particles is preferably in a range of 1 nm to 300 nm, more preferably in a range of 3 nm to 200 nm, and still more preferably in a range of 5 nm to 150 nm.

In a case of preparing the pretreatment liquid, a commercially available product of an aqueous dispersion liquid of resin particles may be used.

Examples of the commercially available product of an aqueous dispersion liquid of resin particles include PES-RESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

In a case where the pretreatment liquid contains resin particles, the content of the resin particles is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

Water-Soluble Organic Solvent

It is preferable that the pretreatment liquid contains at least one water-soluble organic solvent.

As the water-soluble organic solvent, known solvents can be used without particular limitation.

Examples of the water-soluble organic solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and alkyl alcohols having 1 to 4 carbon atoms, glycol ethers, 2-pyrrolidone, and N-methyl-2-pyrrolidone.

Among these, from the viewpoint of suppressing transfer of components, polyhydric alcohol or polyhydric alcohol ether is preferable, and alkanediol, polyalkylene glycol, or polyalkylene glycol ether is more preferable.

In a case where the pretreatment liquid contains a water-soluble organic solvent, the content of the water-soluble organic solvent is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

As the water-soluble organic solvent that can be contained in the pretreatment liquid, a water-soluble organic solvent having a boiling point of lower than 220° C. is also preferable.

From the viewpoint of the drying property of the pretreatment liquid, it is preferable that the pretreatment liquid does not contain an organic solvent having a boiling point of 220° C. or higher or the content of the organic solvent having a boiling point of 220° C. or higher is 5% by mass or less (more preferably 3 mass % or less, still more preferably 1 mass % or less) with respect to the total amount of the pretreatment liquid.

As specific examples of each of the water-soluble organic solvent having a boiling point of less than 220° C. and the organic solvent having a boiling point of 220° C. or higher, the section of "step of preparing first ink" described below can be referred to.

Other Components

The pretreatment liquid may contain other components in addition to the above-described components as necessary.

Examples of other components that may be contained in the pretreatment liquid include known additives such as a surfactant, a solid wetting agent, a silicic acid compound (such as colloidal silica), an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

As other components that can be contained in the pretreatment liquid, components that can be contained in the first ink, described below, can also be referred to.

Physical Properties of Pretreatment Liquid

From the viewpoint of the aggregation rate of the ink, the pH of the pretreatment liquid at 25° C. is preferably in a range of 0.1 to 3.5.

In a case where the pH of the pretreatment liquid is 0.1 or greater, the roughness of the impermeable base material is further decreased and the adhesiveness of the image area is further improved.

In a case where the pH of the pretreatment liquid is 3.5 or less, the aggregation rate is further improved, coalescence of dots (ink dots) caused by the ink on the surface of the impermeable base material is further suppressed, and the roughness of the image is further decreased.

The pH of the pretreatment liquid at 25° C. is more preferably in a range of 0.2 to 2.0. The conditions for measuring the pH of the pretreatment liquid at 25° C. are the same as the conditions for measuring the pH of the ink at 25° C. described above.

In the case where the pretreatment liquid contains an aggregating agent, from the viewpoint of the aggregation rate of the ink, the viscosity of the pretreatment liquid is preferably in a range of 0.5 mPa·s to 10 mPa·s and more preferably in a range of 1 mPa·s to 5 mPa·s.

The viscosity in the present disclosure is a value measured at 25° C. using a viscometer unless otherwise specified.

As the viscometer, for example, a VISCOMETER TV-22 type viscometer (manufactured by Toki Sangyo Co., Ltd.) is used.

The surface tension of the pretreatment liquid is preferably 60 mN/m or less, more preferably in a range of 20 mN/m to 50 mN/m, and still more preferably in a range of 30 mN/m to 45 mN/m.

The surface tension in the present disclosure is a value measured at a temperature of 25° C. unless otherwise specified.

The surface tension is measured using, for example, an Automatic Surface Tentiometer CBVP-Z (manufactured by Kyowa Interface Science Co., Ltd.).

Step of Preparing First Ink

The step of preparing the first ink (hereinafter, also referred to as "first ink preparation step") is a step of preparing the first ink containing a first pigment, a first resin, and water.

The first ink preparation step may be a step of simply preparing the first ink that has been prepared in advance or a step of preparing the first ink.

A method of producing the first ink is not particularly limited, and a known method of mixing components can be employed.

Water

The first ink contains water.

The content of water is preferably 30% by mass or greater, more preferably 40% by mass or greater, and still more preferably 50% by mass or greater with respect to the total amount of the first ink.

The upper limit of the content of water depends on the amount of other components, but is preferably 90% by mass or less and more preferably 80% by mass or less with respect to the total amount of the first ink.

First Pigment

The first ink contains a first pigment.

The first pigment denotes all pigment components (that is, one or two or more kinds of pigments) contained in the first ink.

The first pigment is not particularly limited and may be an organic pigment or an inorganic pigment.

Examples of the organic pigment include an azo pigment, a polycyclic pigment (such as a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment), a chelate dye, a nitro pigment, a nitroso pigment, and aniline black.

Examples of the inorganic pigment include a white inorganic pigment, iron oxide, barium yellow, cadmium red, chrome yellow, and carbon black. A preferred embodiment of the white inorganic pigment will be described below.

Examples of the first pigment include pigments described in paragraphs 0096 to 0100 of JP2009-241586A.

The first ink containing a chromatic pigment or a black pigment as the first pigment can be used as, for example, a color ink (for example, a cyan ink, a magenta ink, or a yellow ink) or a black ink.

Further, the first ink in a case of containing a white pigment (for example, a white inorganic pigment) as the first pigment can be used as, for example, a white ink (hereinafter, also referred to as "white ink").

Further, the first ink in a case of containing a white pigment and a pigment of a color other than white as the first pigment can also be used as an ink in which a chromatic tint is added to the white color.

Examples of the white inorganic pigment include titanium dioxide ($TiO_2$), barium sulfate, calcium carbonate, aluminum hydroxide, silica, zinc oxide, zinc sulfide, mica, talc, and pearl. Among the examples of the white inorganic pigment, titanium dioxide, barium sulfate, calcium carbonate, or zinc oxide is preferable, and titanium dioxide is more preferable.

The average primary particle diameter of the white inorganic pigment is, for example, in a range of 150 nm to 400 nm.

In a case where the average primary particle diameter thereof is 150 nm or greater, the concealing property is further improved. Here, the concealing property is a property of concealing the ground with an image (for example, a white image).

In a case where the average primary particle diameter thereof is 400 nm or less, the jettability of the first ink is further improved.

The average primary particle diameter of the white inorganic pigment is preferably in a range of 250 nm to 350 nm and more preferably in a range of 250 nm to 300 nm.

The average primary particle diameter of the white inorganic pigment is a value measured using a transmission electron microscope (TEM). A transmission electron microscope 1200EX (manufactured by JEOL Ltd.) can be used for the measurement.

Specifically, the average primary particle diameter is defined as a value obtained by adding the ink diluted to 1000 times dropwise to Cu200 mesh (manufactured by JEOL Ltd.) to which a carbon film has been attached, drying the ink, measuring the equivalent circle diameters of 300 independent particles that do not overlap each other in the image enlarged at a magnification of 100000 times using a TEM, and simply averaging the measured values.

The content of the first pigment is preferably in a range of 1% by mass to 20% by mass, more preferably in a range of 1% by mass to 15% by mass, and still more preferably in a range of 1% by mass to 10% by mass with respect to the total amount of the first ink.

First Resin

The first ink contains a first resin.

Here, the first resin denotes all the resin components (that is, one or two or more kinds of resins) contained in the first ink.

In the image recording step described below, the resin particles in the first ink are aggregated in a case where the first resin in the first ink and the aggregating agent in the pretreatment liquid come into contact with each other on the impermeable base material. In this manner, the adhesiveness of the image is improved.

The first resin is not particularly limited, and preferred examples thereof include an acrylic resin, a polyester resin, a polyurethane resin, and a polyolefin resin.

The content of the first resin is preferably in a range of 1% by mass to 30% by mass, more preferably in a range of 2% by mass to 20% by mass, still more preferably in a range of 2% by mass to 15% by mass, and even still more preferably in a range of 2% by mass to 10% by mass with respect to the total amount of the first ink.

Specific examples of the first resin include a pigment dispersion resin for dispersing the first pigment and resin particles which are particles consisting of a resin.

Pigment Dispersion Resin

The first resin may contain a pigment dispersion resin.

In a case where the first resin contains the pigment dispersion resin, the first ink contains a resin-coated pigment having a structure in which at least a part of the surface of the first pigment is coated with the pigment dispersion resin.

A water-insoluble resin is preferable as the pigment dispersion resin.

An acrylic resin is preferable as the pigment dispersion resin.

Examples of the pigment dispersion resin include the pigment dispersion resins described in WO2013/180074A, JP5863600B, JP2018-28080A, JP2017-149906A, and JP2016-193981A. The pigment dispersion resin is also referred to as "resin dispersant" or the like.

Further, as a combination of the first pigment and the pigment dispersion resin, for example, a resin-coated pigment coated with a pigment by a crosslinked water-soluble resin described in JP5404669B may be employed. The resin-coated pigment in this case can be prepared by, for example, using an acrylic resin containing a carboxy group as a water-soluble resin and a bifunctional or higher functional epoxy compound as a crosslinking agent.

From the viewpoint of the adsorptivity to the pigment, the pigment dispersion resin has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornane ring structure, an isobornane ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of the performance of dispersing the pigment, it is preferable that the pigment dispersion resin contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

From the viewpoints of the pigment dispersibility and the storage stability, the acid value of the resin dispersant is preferably in a range of 30 mgKOH/g to 100 mgKOH/g, more preferably in a range of 30 mgKOH/g to 85 mgKOH/g, and still more preferably in a range of 50 mgKOH/g to 85 mgKOH/g.

Here, the acid value is defined as the mass (mg) of KOH required to completely neutralize 1 g of a resin and is measured by the method described in JIS standard (JIS K 0070, 1992).

The weight-average molecular weight (Mw) of the pigment dispersion resin is preferably 30000 or greater, more preferably in a range of 30000 to 150000, still more preferably in a range of 30000 to 100000, and even still more preferably in a range of 30000 to 80000.

In a case where the first resin contains the pigment dispersion resin, the content of the pigment dispersion resin is preferably in a range of 1% by mass to 25% by mass, more preferably in a range of 1% by mass to 20% by mass, still more preferably in a range of 1% by mass to 15% by mass, and even still more preferably in a range of 1% by mass to 10% by mass with respect to the total amount of the first ink.

In a case where the first resin contains the pigment dispersion resin, the ratio of the pigment dispersion resin (D) to the pigment (P) (that is, the D/P ratio) is preferably in a range of 0.05 to 3, more preferably in a range of 0.05 to 2, still more preferably in a range of 0.05 to 1, and even still more preferably in a range of 0.05 to 0.7.

Resin Particles

The first resin may contain resin particles.

Here, the resin particles are distinguished from the pigment dispersion resin described above in terms that the particles consist of a resin.

A water-insoluble resin is preferable as the resin constituting the resin particles.

In a case where the first resin contains resin particles, the resin particles in the first ink are aggregated in a case where the resin particles in the first ink and the aggregating agent in the pretreatment liquid come into contact with each other on the impermeable base material so that the first ink is thickened. Therefore, in a case where the first resin contains resin particles, the strength and adhesiveness of the image are further improved as compared with a case where the first resin does not contain resin particles.

Further, in the case where the first resin contains resin particles, an increase in viscosity of the first ink is further suppressed and degradation of the jettability of the first ink is further suppressed as compared with a case where the first resin contains the same mass of a water-soluble resin as the mass of the resin particles.

The glass transition temperature of the resin particles (that is, the glass transition temperature of the resin in the resin particles) is not particularly limited.

From the viewpoint of further improving the strength of the image, the glass transition temperature (Tg) of the resin particles is preferably 20° C. or higher, more preferably 50° C. or higher, and still more preferably 80° C. or higher.

From the viewpoint of the manufacturing suitability of the resin particles, the glass transition temperature (Tg) of the resin particles is preferably 150° C. or lower and more preferably 130° C. or lower.

In the method of producing an image recorded material of the present disclosure, from the viewpoint of further improving the adhesiveness of the image, the pretreatment liquid contains a resin, the first resin in the first ink contains resin particles, and the glass transition temperature of the resin contained in the pretreatment liquid is preferably lower than the glass transition temperature of the resin particles contained in the first resin.

In this case, the value obtained by subtracting the glass transition temperature of the resin contained in the pretreatment liquid from the glass transition temperature of the resin particles contained in the first resin is preferably 20° C. or higher, more preferably 30° C. or higher, and still more preferably 40° C. or higher.

The upper limit of the value is not particularly limited, and the upper limit thereof may be 100° C., 150° C., 200° C., or the like.

As the resin particles, particles consisting of an acrylic resin (hereinafter, also referred to as acrylic resin particles), particles consisting of a polyester resin (hereinafter, also referred to as polyester resin particles), particles consisting of a polyurethane resin (hereinafter, also referred to as polyurethane resin particles), or particles consisting of a polyolefin resin (hereinafter, also referred to as polyolefin resin particles).

From the viewpoint of further improving the adhesiveness and the rub resistance of the image, it is preferable that the resin particles contained in the first ink include acrylic resin particles.

In a case where the resin particles contained in the first ink include acrylic resin particles, the proportion of the acrylic resin particles in the resin particles contained in the first ink is preferably 60% by mass or greater, more preferably 80% by mass or greater, and still more preferably 90% by mass or greater.

In a case where the proportion of the acrylic resin particles in the resin particles contained in the first ink is 60% by mass or greater, the adhesiveness of the image is further improved.

As the resin particles, self-dispersing resin particles are preferable.

Examples of the self-dispersing resin particles include self-dispersing polymer particles described in paragraphs 0062 to 0076 of JP2016-188345A and paragraphs 0109 to 0140 of WO2013/180074A.

The resin in the resin particles has preferably an alicyclic structure or an aromatic ring structure and more preferably an alicyclic structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornene ring structure, an isobornene ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

As the resin in resin particles, an acrylic resin having at least one selected from the group consisting of a benzyl (meth)acrylate unit, a phenoxyethyl (meth)acrylate unit, and an alicyclic structure-containing (meth)acrylate unit, and a (meth)acrylic acid unit is more preferable, and an acrylic resin having at least one selected from the group consisting of a benzyl (meth)acrylate unit, a phenoxyethyl (meth) acrylate unit, and an alicyclic structure-containing (meth) acrylate unit, and a (meth)acrylic acid unit, an alkyl (meth) acrylate unit containing an alkyl group having 1 to 4 carbon atoms, and an alkyl (meth)acrylate unit containing an alkyl group having 5 to 12 carbon atoms is still more preferable.

As the alicyclic structure-containing (meth)acrylate, at least one selected from alkyl (meth)acrylate containing a cycloalkyl group having 3 to 10 carbon atoms (such as cyclohexyl (meth)acrylate), isobornyl (meth)acrylate, adamantyl (meth)acrylate, and dicyclopentanyl (meth)acrylate is preferable, and at least one selected from isobornyl (meth)acrylate, adamantyl (meth)acrylate, or dicyclopentanyl (meth)acrylate is more preferable.

From the viewpoint of the self-dispersibility, the aggregating properties in a case of image recording, and the like, the acid value of the resin in the resin particles is preferably in a range of 25 mgKOH/g to 100 mgKOH/g, more preferably in a range of 30 mgKOH/g to 90 mgKOH/g, and still more preferably in a range of 35 mgKOH/g to 80 mgKOH/g.

The molecular weight of the resin in the resin particles is preferably in a range of 1000 to 300000, more preferably in a range of 2000 to 200000, and still more preferably in a range of 5000 to 100000 in terms of the weight-average molecular weight.

The weight-average molecular weight is measured by gel permeation chromatography (GPC). The details of GPC are as described above.

The volume average particle diameter of the resin particles is preferably in a range of 1 nm to 200 nm, more preferably in a range of 3 nm to 200 nm, and still more preferably in a range of 5 nm to 50 nm.

In a case where the first ink contains resin particles, the content of the resin particles is preferably in a range of 1% by mass to 25% by mass, more preferably in a range of 2% by mass to 20% by mass, still more preferably in a range of 2% by mass to 15% by mass, and even still more preferably in a range of 2% by mass to 10% by mass with respect to the total amount of the first ink.

Water-Soluble Organic Solvent Having Boiling Point of Lower than 220° C.

It is preferable that the first ink contains at least one water-soluble organic solvent having a boiling point of lower than 220° C.

In this manner, the lamination strength of the image recorded material is further improved.

In the present disclosure, the boiling point denotes a boiling point at 1 atm (101325 Pa).

Examples of the water-soluble organic solvent having a boiling point of lower than 220° C. include 1,2-propanediol (also referred to as propylene glycol; PG) (boiling point of 188° C.), 1,3-propanediol (boiling point of 213° C.), propylene glycol monomethyl ether (boiling point of 121° C.), ethylene glycol (boiling point of 197° C.), ethylene glycol monomethyl ether (boiling point of 124° C.), propylene glycol monoethyl ether (boiling point of 133° C.), ethylene glycol monoethyl ether (boiling point of 135° C.), propylene glycol monopropyl ether (boiling point of 149° C.), ethylene glycol monopropyl ether (boiling point of 151° C.), propylene glycol monobutyl ether (boiling point of 170° C.), ethylene glycol monobutyl ether (boiling point of 171° C.), 2-ethyl-1-hexanol (boiling point of 187° C.), dipropylene glycol monomethyl ether (boiling point of 188° C.), diethylene glycol dimethyl ether (boiling point of 162° C.), diethylene glycol diethyl ether (boiling point of 188° C.), and dipropylene glycol dimethyl ether (boiling point of 175° C.).

In a case where the first ink contains a water-soluble organic solvent having a boiling point of lower than 220° C., the content of the water-soluble organic solvent having a boiling point of lower than 220° C. is preferably in a range of 1% by mass to 50% by mass, more preferably in a range of 5% by mass to 40% by mass, still more preferably in a range of 10% by mass to 40% by mass, and even still more preferably in a range of 15% by mass to 35% by mass with respect to the total amount of the ink.

Organic Solvent Having Boiling Point 220° C. or Higher

The content of the organic solvent having a boiling point of 220° C. or higher (hereinafter, also referred to as "high-boiling point solvent") in the first ink is preferably 5% by mass or less. In this manner, the lamination strength of the image recorded material and the adhesiveness of the image are further improved.

Here, "the content of the organic solvent having a boiling point of 220° C. or higher in the first ink is 5% by mass or less" denotes that the first ink does not contain the organic solvent having a boiling point of 220° C. or higher (that is, the content of the organic solvent having a boiling point of 220° C. or higher in the first ink is 0% by mass) or even in a case where the first ink contains the organic solvent having a boiling point of 220° C. or higher, the content of the organic solvent having a boiling point of 220° C. or higher is 5% by mass or less with respect to the total amount of the first ink.

The content of the organic solvent having a boiling point of 220° C. or higher in the first ink is more preferably 3% by mass or less, still more preferably 2% by mass or less, even still more preferably 1% by mass or less, and even still more preferably 0% by mass.

The expression "the content of the organic solvent having a boiling point of 220° C. or higher in the second ink is 5% by mass or less" described below has the same meaning as "the content of the organic solvent having a boiling point of 220° C. or higher in the first ink is 5% by mass or less, and the preferable content of the high-boiling point solvent in the second ink is also the same as the preferable content of the high-boiling point solvent in the first ink.

Examples of the organic solvent having a boiling point of 220° C. or higher include glycerin (boiling point of 290° C.), 1,2-hexanediol (HDO) (boiling point of 223° C.), diethylene glycol (boiling point of 245° C.), diethylene glycol monobutyl ether (boiling point of 230° C.), triethylene glycol (boiling point of 285° C.), dipropylene glycol (boiling point of 232° C.), tripropylene glycol (boiling point 267° C.), trimethylolpropane (boiling point of 295° C.), 2-pyrrolidone (boiling point of 245° C.), tripropylene glycol monomethyl ether (boiling point of 243° C.), and triethylene glycol monomethyl ether (boiling point of 248° C.).

Surfactant

The first ink may contain at least one kind of surfactant.
Examples of the surfactant include a nonionic surfactant, a cationic surfactant, an anionic surfactant, and a betaine surfactant.

Preferred examples of the surfactant include an acetylene glycol-based surfactant, which is a kind of a nonionic surfactant.

As the acetylene glycol-based surfactant, for example, the acetylene glycol-based surfactants described in paragraphs 0070 to 0080 of WO2017/149917A can be used.

Examples of the acetylene glycol-based surfactant include a polyalkylene oxide adduct (preferably a polyethylene oxide adduct) of 2,4,7,9-tetramethyl-5-decyne-4,7-diol, a polyalkylene oxide adduct (preferably a polyethylene oxide adduct) of 3,6-dimethyl-4-octyne-3,6-diol, a polyalkylene oxide adduct (preferably a polyethylene oxide adduct) of 2,5,8,11-tetramethyl-6-dodecyne-5,8-diol, and a polyalkylene oxide adduct (preferably a polyethylene oxide adduct) of 2,5-dimethyl-3-hexyne-2,5-diol.

Examples of commercially available products of the acetylene glycol-based surfactant include the SURFYNOL Series (such as SURFYNOL 420, SURFYNOL 440, SURFYNOL 465, and SURFYNOL 485), OLFINE Series (such as OLFINE E1010 and OLFINE E1020), and DYNOL Series (such as DYNOL 604) (all manufactured by Air Products and Chemicals Inc. or Nissin Chemical Co., Ltd.), and ACETYLENOL (manufactured by Kawaken Fine Chemicals Co., Ltd.).

Commercially available products of the acetylene glycol-based surfactants are also provided by The Dow Chemical Company, General Aniline & Film Corporation, and the like.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the first ink contains a surfactant, the content of the surfactant in the first ink is appropriately adjusted in consideration of the surface tension of the first ink.

The content of the surfactant in the first ink is preferably in a range of 0.01% by mass to 5% by mass, more preferably in a range of 0.05% by mass to 3% by mass, and still more preferably in a range of 0.1% by mass to 2% by mass with respect to the total amount of the first ink.

Silicic Acid Compound

The first ink may contain at least one silicic acid compound.

In a case where the first ink contains a silicic acid compound, the jetting stability of the first ink from an ink jet head can be further improved.

As the silicic acid compound, for example, the compounds described in paragraphs 0058 to 0075 of JP5430316B can be used.

As the silicic acid compound, a silicate (such as sodium silicate, potassium silicate, calcium silicate, magnesium silicate, or an ammonium salt of silicic acid) or silicic anhydride (silica) is preferable, silica is more preferable, and colloidal silica is still more preferable.

As the colloidal silica, a commercially available product may be used.

Specific examples of the commercially available product include SNOWTEX S, SNOWTEX XS, SNOWTEX 20, SNOWTEX 30, SNOWTEX 40, SNOWTEX N, SNOWTEX C, and SNOWTEX O (all manufactured by Nissan Chemical Corporation.

The content of the silicic acid compound in the first ink is preferably in a range of 0.0001% by mass to 1% by mass, more preferably in a range of 0.0005% by mass to 0.5% by mass, still more preferably in a range of 0.001% by mass to 0.5% by mass, and even still more preferably in a range of 0.01% by mass to 0.3% by mass with respect to the total amount of the first ink.

Other Components

The first ink may contain components other than the components described above.

Examples of other components include known additives such as urea, a urea derivative, a wax, a fading inhibitor, an emulsion stabilizer, a penetration enhancer, an ultraviolet absorbing agent, a preservative, a fungicide, a pH adjuster, an antifoaming agent, a viscosity adjuster, a dispersion stabilizer, and a chelating agent.

Preferable Physical Properties of First Ink

The viscosity of the first ink (25° C.) is preferably in a range of 1.2 mPa·s to 15.0 mPa·s, more preferably 2 mPa·s or greater and less than 13 mPa·s, and still more preferably 2.5 mPa·s or greater and less than 10 mPa·s.

The surface tension (25° C.) of the first ink is preferably in a range of 25 mN/m to 50 mN/m, more preferably in a range of 30 mN/m to 45 mN/m, and still more preferably in a range of 30 mN/m to 40 mN/m.

The pH of the first ink at 25° C. is preferably in a range of 6 to 11, more preferably in a range of 7 to 10, and still more preferably in a range of 7 to 9.

The pH of the first ink at 25° C. is measured using a commercially available pH meter.

Step of Preparing Second Ink

The step of preparing the second ink (hereinafter, also referred to as "second ink preparation step") is a step of preparing a second ink containing a second pigment, a second resin, and water and having a surface tension less than the surface tension of the first ink.

The second ink preparation step may be a step of simply preparing the second ink that has been prepared in advance or a step of preparing the second ink.

The second ink is the same as the first ink except that the surface tension thereof is less than the surface tension of the first ink, and the preferred embodiments of the second ink are also the same as the preferred embodiments of the first ink.

The specific examples and the preferred embodiments of the second pigment contained in the second ink are the same as the specific examples and the preferred embodiments of the first pigment contained in the first ink.

It is preferable that the hue of the second pigment is different from the hue of the first pigment.

Further, it is preferable that the hue of the second ink is different from the hue of the first ink.

One specific embodiment of the method of producing an image recorded material of the present disclosure is an embodiment in which the hue of the first ink is a hue other than white (preferably a chromatic color or black, such as cyan, magenta, yellow, or black) and the hue of the second ink is white (see examples described below).

In the embodiment, it is preferable that the first pigment contained in the first ink is a chromatic pigment and/or a black pigment and that the second pigment contained in the second ink is a white pigment.

In the embodiment, for example, a colored image (that is, a chromatic color image or a black image; for example, a pattern image such as characters or figures) formed with the first ink is recorded on the impermeable base material using a base material having transparency as the impermeable base material, and a white image (for example, a solid image) formed with the second ink is recorded on the impermeable base material on which the colored image has been recorded such that the colored image is concealed. In this case, in a case where observation is made from an image non-recorded surface (that is, the surface on which the image has not been recorded) side of the impermeable base material, the colored image formed with the first ink which has the white image formed with the second ink as the background can be visually recognized through the impermeable base material. Meanwhile, in a case where observation is made from an image recorded surface (that is, the surface on which the image has been recorded) side of the impermeable base material, the colored image and the impermeable base material are concealed by the white image formed with the second ink, and thus the colored image and the impermeable base material are unlikely to be visually recognized.

In the embodiment, the area of the white image formed with the second ink tends to be set to be greater than the area of the colored image formed with the first ink in order to conceal the colored image formed with the first ink. Therefore, in the embodiment, the effect of suppressing the unevenness of the surface of the image and/or the variation in thickness of the image (that is, the effect obtained by setting the surface tension of the second ink being to be less than the surface tension of the first ink and the effect obtained by setting the applied mass ratio [(first resin+ second resin)/aggregating agent] to 16.0 or greater) is more effectively exhibited, and thus the lamination strength is further improved.

In the embodiment, for example, an aspect in which a plurality of colored inks (for example, four kinds of inks which are a cyan ink, a magenta ink, a yellow ink, and a black ink) are applied on the region of the impermeable base material where the pretreatment liquid has been applied to record a polychromic colored image and a white ink is applied as a second ink such that the polychromic colored image is covered to record a white image can also be employed. In this case, the relationship between all the plurality of colored inks and the white ink as the second ink does not necessarily satisfy the conditions of the method of producing the image recorded material of the present disclosure, and the relationship between at least one of the plurality of colored inks and the white ink as the second ink may satisfy the conditions of the method of producing the image recorded material of the present disclosure. In this case, among the plurality of colored inks, the colored ink satisfying the conditions of the producing method of the image recorded material of the present disclosure corresponds to the first ink.

The content of the high-boiling point solvent (that is, the organic solvent having a boiling point of 220° C. or higher) in the second ink is also preferably 5% by mass or less. In this manner, the lamination strength of the image recorded material and the adhesiveness of the image are further improved.

From the viewpoint of further improving the lamination strength of the image recorded material and the adhesiveness of the image, the content of the organic solvent having a boiling point of 220° C. or higher is more preferably 5% by mass or less with respect to the total amount of the first ink, and the content of the organic solvent having a boiling point of 220° C. or higher is more preferably 5% by mass or less with respect to the total amount of the second ink.

Difference in Surface Tension [First Ink–Second Ink]

As described above, the second ink has a surface tension less than the surface tension of the first ink.

As described above, the surface tension of the first ink and the surface tension of the second ink each denote a value measured under a temperature condition of 25° C. Examples of the surface tension measuring device are also as described above.

In other words, the value obtained by subtracting the surface tension of the second ink from the surface tension of the first ink (hereinafter, also referred to as "difference in surface tension [first ink–second ink]" or also simply referred to as "difference in surface tension") is greater than 0 mN.

In this manner, the wet spreadability of the second ink on the first ink applied to the impermeable base material is improved, and the unevenness of the surface of the image and/or the variation in thickness of the image is suppressed. As a result, the adhesiveness between the image and the base material for lamination is improved, and the lamination strength in the laminate is improved.

From the viewpoint of further improving the lamination strength, the difference in surface tension [first ink–second ink] is preferably 2.0 mN/m or greater, more preferably 3.0 mN/m or greater, and still more preferably 4.0 mN/m or greater.

The upper limit of the difference in surface tension [first ink–second ink] is not particularly limited, and the upper limit is, for example, 10.0 mN/m.

The specific examples and preferred embodiments of the second resin contained in the second ink are the same as the specific examples and preferred embodiments of the first resin contained in the first ink.

For example, it is preferable that the second resin contains resin particles. In this manner, the adhesiveness between a layer formed with the second ink (hereinafter, also referred to as "second ink layer"), a layer formed with the first ink (hereinafter, also referred to as "first ink layer"), and/or a layer formed with the pretreatment liquid (hereinafter, also referred to as "pretreatment layer") is further improved, and as a result, the lamination strength is further improved.

Difference in Glass Transition Temperature (Ta–Tb)

As a preferred embodiment of the method of producing an image recorded material of the present disclosure, an embodiment in which the first resin contains resin particles and the second resin contains resin particles is exemplified.

In the preferred embodiment, in a case where in the overlapping region (that is, the overlapping region formed such that a region where the pretreatment liquid is applied, a region where the first ink is applied, and a region where the second ink is applied overlap each other in plan view) between the resin particles contained in the first resin and the resin particles contained in the second resin, a glass transition temperature of the resin particles with a greater applied mass per unit area is defined as Ta and a glass transition temperature of the resin particles with a smaller applied mass per unit area is defined as Tb, it is preferable that Ta and Tb satisfy a relationship of 0° C.≤Ta−Tb≤30° C.

The film hardness of the entire image (that is, the image having a layer structure of the second ink layer, the first ink layer, and the pretreatment layer) is further improved, and as a result, the lamination strength is further improved in a case where the relationship of "0° C.≤Ta−Tb" (that is, Tb≤Ta) is satisfied.

The adhesiveness between the second ink layer and the first ink layer is further improved, and as a result, the lamination strength is further improved in a case where the relationship of "Ta−Tb≤30° C." (that is, "Ta−Tb" is 30° C. or lower) is satisfied.

The difference "Ta−Tb" is preferably 25° C. or lower and more preferably 20° C. or lower.

Difference in Viscosity of Mixture (A1−A2)

As a preferred embodiment of the method of producing an image recorded material of the present disclosure, an embodiment in which A1 and A2 satisfy a relationship of A1−A2>0 mPa·s in a case where the viscosity of a mixture obtained by mixing the pretreatment liquid and the first ink is defined as A1 (hereinafter, also referred to as "mixture viscosity A1") and the viscosity of a mixture obtained by mixing the pretreatment liquid and the second ink is defined as A2 (also referred to as "mixture viscosity A2") is exemplified.

In a case where a relationship of A1−A2>0 mPa·s is satisfied, the wet spreadability of the second ink applied on the first ink is further improved, and as a result, the unevenness of the surface of the image and/or the variation in thickness of the image is further suppressed. As a result, the adhesiveness between the image and the base material for lamination is further improved, and the lamination strength is further improved.

From the viewpoint of further improving the lamination strength, the difference "A1−A2" is preferably 10 mPa·s or greater, more preferably 20 mPa·s or greater, and still more preferably 25 mPa·s or greater.

The upper limit of "A1−A2" is not particularly limited, but the upper limit is, for example, preferably 50 mPa·s or less and more preferably 40 mPa·s or less.

Here, the mixture viscosity A1 denotes a value measured as follows.

The pretreatment liquid and the first ink are mixed under a condition of a liquid temperature of 25° C. such that the mass ratio of the pretreatment liquid to the first ink (that is, the mass ratio [pretreatment liquid/first ink]) reaches 0.1. The viscosity of the obtained mixture is measured under a condition of a liquid temperature of 25° C. within 30 minutes from the completion of mixing of the aggregating agent and the first ink.

The viscosity is measured, for example, by using a VISCOMETER TV-22 type viscometer (manufactured by Toki Sangyo Co., Ltd.) as a viscometer.

The mixture viscosity A2 denotes a value measured in the same manner as the measurement of the mixture viscosity A1 except that the first ink is changed to the second ink.

Image Recording Step

The image recording step is a step of sequentially applying the pretreatment liquid, the first ink, and the second ink onto the impermeable base material to record an image.

In the image recording step, the image is recorded by sequentially applying the pretreatment liquid, the first ink, and the second ink under a condition (that is, the application disposition) in which an overlapping region formed such that a region where the pretreatment liquid is applied, a region where the first ink is applied, and a region where the second ink is applied overlap each other in plan view is generated and under a condition (that is, the applied amount) in which the ratio (that is, the applied mass ratio [(first resin+second resin)/aggregating agent]) of the total applied mass of the first resin and the second resin per unit area to the applied mass of the aggregating agent per unit area in the overlapping region is 16.0 or greater and 30.0 or less.

Hereinafter, the image recording step will be described in detail.

Application Order of Pretreatment Liquid, First Ink, and Second Ink

In the image recording step, the pretreatment liquid, the first ink, and the second ink are sequentially applied onto the impermeable base material.

That is, in the image recording step, the pretreatment liquid is applied onto the impermeable base material, the first ink is applied onto the applied pretreatment liquid, and the second ink is applied onto the applied first ink.

The aggregating agent which is a component in the pretreatment liquid aggregates the components (for example, the first resin) in the first ink applied onto the pretreatment liquid and aggregates the components (for example, the second resin) in the second ink applied onto the first ink through the ink, on the impermeable base material.

In this manner, an image having a layer structure of "second ink layer/first ink layer/pretreatment layer (/impermeable base material)" is formed on the impermeable base material. Here, the pretreatment layer, the first ink layer, and the second ink layer each denote a layer derived from the pretreatment liquid, a layer derived from the first ink, and a layer derived from the second ink.

The first ink may be applied onto the pretreatment liquid that has been heated and dried (preferable conditions will be described below) or may be applied to the pretreatment liquid that has not been heated and dried.

From the viewpoint of suppressing bleeding and the like, it is preferable that the first ink is applied onto the pretreatment liquid that has been heated and dried. The preferable conditions for heating and drying the pretreatment liquid will be described below.

The second ink may be applied onto the first ink that has been heated and dried (preferable conditions will be described below) or may be applied onto the first ink that has not been heated and dried.

Even in the embodiment in which the second ink is applied onto the first ink that has not been heated and dried, bleeding and color mixing are suppressed. The reason for this is considered to be that the first ink is already thickened by the action of the pretreatment liquid at the timing of application of the second ink.

From the viewpoint of suppressing bleeding and improving efficiency of image recording, it is preferable that the image recording step is a step of applying the pretreatment liquid onto the impermeable base material, drying and heating the pretreatment liquid, and sequentially applying the first ink and the second ink onto the heated and dried pretreatment liquid.

Application Disposition of Pretreatment Liquid, First Ink, and Second Ink

In the image recording step, the image is recorded by applying the pretreatment liquid, the first ink, and the second ink under a condition (that is, application disposition) in which an overlapping region formed such that a region where the pretreatment liquid is applied, a region where the first ink is applied, and a region where the second ink is applied overlap each other in plan view is generated.

In the image recording step, the pretreatment liquid, the first ink, and the second ink may also be applied under a condition (that is, application disposition) in which the overlapping region and regions other than the overlapping region are generated.

For example, the first ink may be applied in a patterned shape onto the region where the pretreatment liquid is applied to form a pattern-like first ink layer, and the second ink may be applied (for example, in a solid shape) onto a region (for example, a region covering the first ink layer and the entire periphery thereof) straddling the first ink layer and regions other than the first ink layer to form the second ink layer. In this case, the region where the first ink layer is present corresponds to "overlapping region" described above, the region where the second ink layer is present without presence of the first ink layer and the region where the first ink layer and the second ink layer are not present correspond to "region other than the overlapping region" described above.

Applied Amount of Pretreatment Liquid, First Ink, and Second Ink

In the image recording step, the image is recorded by applying the pretreatment liquid, the first ink, and the second ink under a condition (that is, the applied amount) in which the ratio (that is, the applied mass ratio [(first resin+second resin)/aggregating agent]) of the total applied mass of the first resin and the second resin per unit area to the applied mass of the aggregating agent per unit area in the overlapping region is 16.0 or greater and 30.0 or less.

As described above, in a case where the applied mass ratio [(first resin+second resin)/aggregating agent] in the overlapping region is 16.0 or greater, overaggregation of the first resin and the second resin is suppressed in the overlapping region, and the unevenness of the surface (that is, the surface of the second ink layer) of the image (that is, an image having a layer structure of the second ink layer, the first ink layer, and the pretreatment layer, the same applies hereinafter) and/or the variation in thickness of the image, caused by overaggregation is suppressed. As a result, the adhesiveness between the image and the base material for lamination is improved, and thus the lamination strength is improved.

As described above, in a case where the applied mass ratio [(first resin+second resin)/aggregating agent] in the overlapping region is 30.0 or less, insufficient aggregation of the first resin and the second resin is suppressed in the overlapping region. As a result, the adhesiveness between the impermeable base material and the image is improved, and thus the lamination strength is improved.

The applied mass ratio [(first resin+second resin)/aggregating agent] in the overlapping region is calculated based on the applied mass of the aggregating agent per unit area in the overlapping region, the applied mass of the first resin per unit area in the overlapping region, and the applied mass of the second resin per unit area in the overlapping region.

The applied mass (unit of $g/m^2$) of the aggregating agent per unit area in the overlapping region is, for example, calculated based on the applied mass of the pretreatment liquid per unit area in the overlapping region and the content (% by mass) of the aggregating agent with respect to the total amount of the pretreatment liquid.

The applied mass (unit of $g/m^2$) of the first resin per unit area in the overlapping region is, for example, calculated based on the applied mass of the first ink per unit area in the overlapping region and the content (% by mass) of the first resin with respect to the total amount of the first ink.

The applied mass (unit of $g/m^2$) of the second resin per unit area in the overlapping region is, for example, calculated based on the applied mass of the second ink per unit area in the overlapping region and the content (% by mass) of the second resin with respect to the total amount of the second ink.

From the viewpoint of further improving the lamination strength, the applied mass ratio [(first resin+second resin)/aggregating agent] is preferably 16.0 or greater and 25.0 or less and more preferably 16.0 or greater and 20.0 or less.

Further, from the viewpoint of further improving the lamination strength, the lower limit of the applied mass ratio [(first resin+second resin)/aggregating agent] is preferably 16.1 and more preferably 16.2.

The applied mass (unit of $g/m^2$) of the aggregating agent per unit area in the overlapping region is preferably in a range of 0.040 to 0.100 and more preferably in a range of 0.045 to 0.075.

The applied mass (unit of $g/m^2$) of the pretreatment liquid per unit area in the overlapping region is preferably in a range of 1.0 to 2.0 and more preferably in a range of 1.2 to 1.8.

The total applied mass (unit of $g/m^2$) of the first resin and the second resin per unit area in the overlapping region is preferably in a range of 1.00 to 2.50 and more preferably in a range of 1.00 to 2.00.

The total applied mass (unit of $g/m^2$) of the first ink and the second ink per unit area in the overlapping region is preferably in a range of 14.0 to 30.0 and more preferably in a range of 14.5 to 28.0.

The applied mass (unit of $g/m^2$) of the first resin per unit area in the overlapping region is preferably in a range of 0.45 to 1.00 and more preferably in a range of 0.48 to 0.90.

The applied mass (unit of $g/m^2$) of the first ink per unit area in the overlapping region is preferably in a range of 7.0 to 13.0, more preferably in a range of 7.0 to 12.0, and still more preferably in a range of 7.0 to 11.5.

The applied mass (unit of $g/m^2$) of the second resin per unit area in the overlapping region is preferably in a range of 0.40 to 2.00, more preferably in a range of 0.40 to 1.30, and still more preferably in a range of 0.50 to 1.10.

The applied mass (unit of $g/m^2$) of the second ink per unit area in the overlapping region is preferably in a range of 7.0 to 20.0, more preferably in a range of 7.0 to 18.0, and still more preferably in a range of 7.0 to 16.0.

Impermeable Base Material

In the image recording step, the pretreatment liquid, the first ink, and the second ink are applied onto the impermeable base material.

The impermeable base material indicates a base material having a water absorption rate (% by mass, 24 hr.) of less than 0.2 according to ASTMD 570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in a sheet shape or a film shape.

As the resin base material, a base material containing polypropylene, polyethylene terephthalate, nylon, polyethylene, or polyimide is preferable.

The resin base material may be a transparent resin base material.

Here, the term "transparent" indicates that the transmittance of visible light having a wavelength of 400 nm to 700 nm is 80% or greater (preferably 90% or greater).

As described above, in an embodiment in which the hue of the first ink is a hue other than white (preferably a chromatic color or black, such as cyan, magenta, yellow, or black) and the hue of the second ink is white, in a case where the impermeable base material is a transparent resin base material, the colored image formed with the first ink which has the white image formed with the second ink as the background can be visually recognized through the impermeable base material from an image non-recorded surface (that is, the surface on which the image has not been recorded) side of the impermeable base material.

The resin base material may be colored.

The shape of the resin base material is not particularly limited, but a sheet-shaped resin base material is preferable. From the viewpoint of the productivity of a medium to be recorded, a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a flame treatment, a heat treatment, an abrasion treatment, and a light irradiation treatment (UV treatment), but the present invention is not limited thereto.

Application of Pretreatment Liquid

In the image recording step, the application of the pretreatment liquid onto the impermeable base material can be performed by applying a known method such as a coating method, an ink jet method, or a dipping method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

The details of the ink jet method will be described below.

Further, the impermeable base material may be heated before the application of the pretreatment liquid in the image recording step.

The heating temperature is set such that the temperature of the impermeable base material is preferably in a range of 20° C. to 50° C. and more preferably in a range of 25° C. to 40° C.

In the image recording step, the pretreatment liquid may be heated and dried after the application of the pretreatment liquid and before the application of the first ink.

Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied, a method of applying warm air or hot air to the surface of the impermeable base material onto which the pretreatment liquid has been applied, a method of applying heat using an infrared heater from the surface of the impermeable base material onto which the pretreatment liquid has been applied or from a side of the impermeable base material opposite to the surface onto which the pretreatment liquid has been applied, and a method of combining a plurality of these methods.

The heating temperature of heating and drying the pretreatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the treatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

Application of First Ink

In the image recording step, the application of the first ink onto the pretreatment liquid (that is, the pretreatment layer) can also be performed by applying a known method such as a coating method, an ink jet method, or a dipping method, but the ink jet method is preferable.

The method of jetting the first ink in the ink jet method is not particularly limited, and any of known methods such as an electric charge control method of jetting an ink using electrostatic attraction force, a drop-on-demand method (pressure pulse method) using a vibration pressure of a piezoelectric element, an acoustic ink jet method of allowing an ink to be jetted using a radiation pressure by converting an electric signal into an acoustic beam and irradiating the ink with the acoustic beam, and a thermal ink jet (bubble jet (registered trademark)) method of heating an ink to form air bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as an ink jet method, the method described in paragraphs 0093 to 0105 of JP2003-306623A can also be employed.

The application of the first ink using the ink jet method is performed by allowing the first ink to be jetted from a nozzle of an ink jet head.

Examples of the system of the ink jet head include a shuttle system of performing recording while scanning a short serial head in the width direction of a medium to be recorded and a line system of using a line head in which recording elements are aligned in correspondence with the entire area of one side of a medium to be recorded.

In the line system, image recording can be performed on the entire surface of the medium to be recorded by scanning the medium to be recorded in a direction intersecting the direction in which the recording elements are aligned. In the line system, a transport system such as a carriage that scans a short head in the shuttle system is not necessary. Further, in the line system, since movement of a carriage and complicated scanning control between the head and the medium to be recorded are not necessary as compared with the shuttle system, only the medium to be recorded moves.

Therefore, according to the line system, image recording at a higher speed than that of the shuttle system can be realized.

It is preferable to apply the first ink using an ink jet head having a resolution of 300 dpi or greater (more preferably 600 dpi and still more preferably 800 dpi). Here, dpi stands for dot per inch, and 1 inch is 2.54 cm.

From the viewpoint of obtaining a high-definition image, the liquid droplet amount of the first ink to be jetted from the nozzle of the ink jet head is preferably in a range of 1 pL (pico liter) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

In the image recording step, the first ink applied onto the pretreatment liquid (that is, the pretreatment layer) may be heated and dried, and the second ink may be applied onto the heated and dried first ink. The preferable conditions for heating and drying the first ink in a case where the first ink is heated and dried are the same as the preferable conditions for performing heating and drying after application of the second ink described below.

Further, as described above, in the image recording step, the second ink may be applied onto the first ink without heating and drying the first ink applied onto the pretreatment liquid (that is, the pretreatment layer). This is because the first ink has already thickened due to the action of the aggregating agent at the stage of application of the second ink.

Further, the impermeable base material may be heated in advance before the application of the first ink. The heating may also serve as heating and drying of the pretreatment liquid.

The heating temperature may be appropriately set, but the temperature of the impermeable base material is set to be preferably in a range of 20° C. to 50° C. and more preferably in a range of 25° C. to 40° C.

Application of Second Ink

In the image recording step, the application of the second ink onto the first ink (that is, the first ink layer) can also be performed by applying a known method such as a coating method, an ink jet method, or a dipping method, but the ink jet method is preferable.

The ink jet method which can be applied to the application of the second ink is the same as the ink jet method applicable to the application of the first ink described above, and the preferred embodiment is also the same.

In the image recording step, the first ink (that is, the first ink layer) and the second ink (that is, the second ink layer) on the impermeable base material may be heated and dried after the application of the second ink.

Examples of the means for heating and drying the ink include known heating means such as a heater, known air blowing means such as a dryer, and means for combining these.

Examples of the method for performing drying by heating include a method of applying heat using a heater or the like from a side of the impermeable base material opposite to the surface onto which the first ink and the second ink have been applied, a method of applying warm air or hot air to the surface of the impermeable base material onto which the first ink and the second ink have been applied, a method of applying heat using an infrared heater from the surface of the impermeable base material onto which the first ink and the second ink have been applied or a side of the impermeable base material opposite to the surface onto which the first ink and the second ink have been applied, and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 30 seconds, and particularly preferably in a range of 5 seconds to 20 seconds.

Method of Producing Laminate

As described above, according to the method of producing an image recorded material of the present disclosure, an image recorded material including an impermeable base material and an image recorded on the impermeable base material and having excellent lamination strength in a case where a base material for lamination is laminated on the image can be produced.

Therefore, the method of producing an image recorded material of the present disclosure is suitably used for producing a laminate including the above-described image recorded material and a base material for lamination which is laminated on a side where the image of the image recorded material is disposed.

Hereinafter, the method of producing the laminate will be described.

The method of producing the laminate of the present disclosure includes a step of obtaining an image recorded material by the method of producing an image recorded material of the present disclosure described above, and a step of laminating a base material for lamination on a side of the image recorded material where the image is disposed to obtain a laminate.

According to the method of producing the laminate of the present disclosure, a laminate having excellent lamination strength (that is, peeling strength) between the image recorded material and the base material for lamination can be produced.

The step of obtaining an image recorded material can refer to the image recording method of the present disclosure described above.

The step of obtaining a laminate is a step of laminating the base material for lamination on a side of the image recorded material where the image has been disposed to obtain a laminate.

As the base material for lamination, a resin base material is preferable.

The resin base material is not particularly limited, and examples thereof include a base material formed of a thermoplastic resin.

A base material obtained by molding a thermoplastic resin in a sheet shape is exemplified as the resin base material.

It is preferable that the resin base material contains polypropylene, polyethylene terephthalate, nylon, polyethylene, or polyimide.

The shape of the resin base material is not particularly limited, but it is preferable that the resin base material has a sheet shape.

The thickness of the resin base material is preferably in a range of 10 μm to 200 μm and more preferably in a range of 10 μm to 100 μm.

In the present step, the base material for lamination may be laminated directly on a side of the image recorded material where the image has been disposed or through another layer (for example, an adhesive layer).

The base material for lamination in a case of being directly laminated on a side of the image recorded material where the image has been disposed can be laminated according to a known method such as thermocompression bonding or thermal fusion welding.

Further, the base material for lamination in a case of being laminated through an adhesive layer on a side of the image recorded material where the image has been recorded can be laminated according to, for example, a method of coating the side of the image recorded material where the image has been recorded with an adhesive, placing the base material for lamination, and bonding the image recorded material to the base material for lamination.

Further, the base material for lamination in the case of being laminated through an adhesive layer on a side of the image recorded material where the image has been recorded can be laminated according to an extrusion lamination method (that is, sandwich lamination) or the like.

It is preferable that the adhesive layer in the mode of laminating the base material through the adhesive layer on a side of the image recorded material where the image has been recorded contains an isocyanate compound.

In a case where the adhesive layer contains an isocyanate compound, since the adhesiveness between the adhesive layer and the ink-derived layer of the image is further improved, the lamination strength can be further improved.

Image Recorded Material

The image recorded material according to an example of the present disclosure includes an impermeable base material and an image recorded on the impermeable base material, in which the image includes a pretreatment layer that is in contact with the impermeable base material and contains an aggregating agent, a first layer that is in contact with the pretreatment layer and contains a first pigment and a first resin, and a second layer that is in contact with the first layer and contains a second pigment and a second resin and also includes an overlapping region where the pretreatment layer, the first layer, and the second layer overlap each other in plan view, the aggregating agent is at least one selected from the group consisting of an organic acid, an organic acid salt, a polyvalent metal compound, and a metal complex, and the ratio of the total mass of the first resin and the second resin per unit area to the mass of the aggregating agent per unit area in the overlapping region is 16.0 or greater and 30.0 or less.

The image recorded material according to the present example has excellent lamination strength in a case where the base material for lamination is laminated on the image.

It is preferable that the image recorded material according to the present example is produced by the method of producing an image recorded material according to the present disclosure. In this case, the first layer corresponds to the dried first ink layer, and the second layer corresponds to the dried second ink layer. Here, solvents may remain in each of the first layer, the second layer, and the pretreatment layer.

The preferred embodiment of each component in the image recorded material according to the present example is the same as the preferred embodiment of each component described in the section of the method of producing the image recorded material of the present disclosure.

Laminate

The laminate according to an example of the present disclosure includes the above-described image recorded material of the present disclosure and a base material for lamination which is laminated on the image of the above-described image recorded material.

The laminate according to the present example has excellent lamination strength.

The base material for lamination in the laminate according to the present example may be laminated directly on a side of the image recorded material where the image has been recorded or may be laminated via another layer (for example, an adhesive layer).

The laminate according to the present example is preferably produced by the method of producing a laminate of the present disclosure.

The preferred embodiments of the base material for lamination and the adhesive layer are respectively the same as the preferred embodiments described in the section of the method of producing a laminate.

EXAMPLES

Hereinafter, examples of the present disclosure will be described below, but the present disclosure is not limited to the following examples.

Hereinafter, "%" and "part" respectively indicate "% by mass" and "part by mass" unless otherwise specified.

"Tg" denotes the glass transition temperature, and a difference in Tg (Ta–Tb) denotes a difference in glass transition temperature (Ta–Tb) described above.

As "water", ion exchange water was used.

Preparation of Pretreatment Liquid

A pretreatment liquid PC1, a pretreatment liquid PC2, and a pretreatment liquid PC3 were respectively prepared in the following manner.

Preparation of Pretreatment Liquid PC1

The components having the following composition were mixed to prepare the pretreatment liquid PC1.

Composition of Pretreatment Liquid PC1

Glutaric acid (manufactured by FUJIFILM Wako Pure Chemical Corporation; aggregating agent (organic acid)): 4% by mass
Resin particles PC1 shown below (Tg of 50° C.): 5% by mass as solid content of resin particles PC1 shown below
1,2-Propanediol (manufactured by FUJIFILM Wako Pure Chemical Corporation; water-soluble organic solvent): 10% by mass
Water: remaining amount set such that total amount of composition was 100% by mass Preparation of Aqueous Dispersion Liquid of Resin Particles PC1 (Tg of 50° C.)

As an aqueous dispersion liquid of the resin particles PC1 (Tg of 50° C.), "PESRESIN A-520" (manufactured by Takamatsu Oil & Fat Co., Ltd., 30 mass % aqueous dispersion liquid of polyester resin particles (Tg of 50° C.) as resin particles PC1) was prepared.

Preparation of Pretreatment Liquid PC2

The pretreatment liquid PC2 was prepared in the same manner as the preparation of the pretreatment liquid PC1 except that glutaric acid serving as the aggregating agent was changed to the same mass of calcium acetate (manufactured by FUJIFILM Wako Pure Chemical Corporation; aggregating agent (organic acid salt)) as the mass of the glutaric acid.

Preparation of Pretreatment Liquid PC3

The pretreatment liquid PC3 containing no resin was prepared in the same manner as the preparation of the pretreatment liquid PC1 except that the aqueous dispersion liquid of the resin particles PC1 was not used and the amount of water was adjusted such that the content of glutaric acid was set to 4% by mass.

Preparation of First Ink and Second Ink

Inks A to H as the first inks and inks I to M as the second inks were respectively prepared.
All the first inks were cyan inks, and all the second inks were white inks.
Hereinafter, the details will be described.

Preparation of Ink A

The ink A as the first ink was prepared in the following manner.

Synthesis of Pigment Dispersion Resin 1

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise thereto for 3 hours. After completion of the dropwise addition, the solution was allowed to further react for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was reprecipitated twice in a large excess amount of hexane, and the deposited resin was dried. In this manner, 96 g of a pigment dispersion resin 1 which was a benzyl methacrylate/methyl methacrylate/methacrylic acid copolymer (=60/30/10 [mass ratio]) was obtained.

The composition of the obtained pigment dispersion resin 1 was confirmed by $^1$H-NMR, and the weight-average molecular weight (Mw) acquired by GPC in terms of polystyrene was 44600. Further, the acid value acquired by the method described in JIS standard (JISK0070:1992) was 65.2 mgKOH/g.

Preparation of Pigment Dispersion Liquid C

C.I. Pigment Blue 15:3 (manufactured by Dainichi Seika Kogyo Co., Ltd.) (4 parts) serving as a cyan pigment, the pigment dispersion resin 1 (2 parts) obtained in the above-described manner, methyl ethyl ketone (42 parts), a 1 N NaOH aqueous solution (5.5 parts), and water (87.2 parts) were mixed and dispersed by a beads mill using zirconia beads with a diameter of 0.1 mmφ at 2500 rpm (revolutions per minute, the same applies hereinafter) for 6 hours. The obtained dispersion liquid was concentrated under reduced pressure at 55° C. until methyl ethyl ketone was sufficiently distilled off, a part of water was further removed, a centrifugal treatment (using a 50 mL centrifuge tube) was performed at 8000 rpm for 30 minutes using a high-speed centrifugal cooler 7550 (manufactured by Kubota Corporation) so that the precipitate was removed, thereby recovering the supernatant.

As described above, a pigment dispersion liquid C containing a resin-coated pigment in which at least a part of the cyan pigment was coated with the pigment dispersion resin 1 was obtained.

Preparation of Aqueous Dispersion Liquid of Resin Particles 1 (Tg of 100° C.)

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution consisting of 336.4 g of methyl methacrylate, 69.6 g of isobornyl methacrylate, 116.0 g of 2-ethylhexyl methacrylate, 58 g of methacrylic acid, 108 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant rate such that the dropwise addition was completed in 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1): A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a methyl methacrylate/isobornyl methacrylate/2-ethylhexyl methacrylate/methacrylic acid (=58/12/20/10 [mass ratio]) copolymer.

The weight-average molecular weight (Mw) of the copolymer was 35000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of water was added dropwise to the solution, which had been heated to 70° C., at a speed of 10 mL/min, to carry out aqueous dispersion (dispersion step).

Thereafter, the isopropanol, the methyl ethyl ketone, and the water in a total amount of 287.0 g were distilled off by maintaining the temperature of the liquid in the reaction container at 70° C. for 1.5 hours under reduced pressure (solvent removal step). 0.278 g (440 ppm as benzisothiazolin-3-one as the solid content of the polymer) of PROXEL GXL (S) (manufactured by Arch Chemicals, Inc.) was added to the obtained liquid.

The obtained liquid was filtered using a filter having a mesh diameter of 1 μm, and the filtrate was collected, thereby obtaining an aqueous dispersion liquid of resin particles 1 whose concentration of solid contents was 26.5% by mass.

The Tg of the resin particles 1 was 100° C., and the volume average particle diameter thereof was 10 nm.

Preparation of Ink A

An ink A having the following composition was prepared using the pigment dispersion liquid C, the aqueous dispersion liquid of the resin particles 1, 1,2-propanediol (hereinafter, also referred to as "PG"; water-soluble organic solvent having a boiling point of lower than 220° C.), a surfactant (OLFINE (registered trademark) E1010, manufactured by Nissin Chemical Co., Ltd.), colloidal silica (SNOWTEX (registered trademark) XS (solid content of 20% by mass), manufactured by Nissan Chemical Corporation), and water.

Composition of Ink A

Cyan pigment: 4% by mass
Pigment dispersion resin 1: 2% by mass
1,2-Propanediol (PG; water-soluble organic solvent having a boiling point of lower than 220° C.): 25% by mass
Surfactant (OLFINE (registered trademark) E1010, manufactured by Nissin Chemical Co., Ltd.): 0.5% by mass
Resin particles 1: 5% by mass
Colloidal silica (SNOWTEX (registered trademark) XS (silica solid content of 20% by mass), manufactured by Nissan Chemical Corporation): 0.06% by mass as silica solid content
Water: remaining amount set such that total amount of composition was 100% by mass Preparation of Inks B to H Each of inks B to H as the first ink was prepared in the same manner as the preparation of the ink A except that the composition of the ink was changed as listed in Table 1.

In Table 1, HDO is 1,2-hexanediol, which is a high-boiling point solvent (that is, an organic solvent having a boiling point of 220° C. or higher), the resin particles 2 are resin particles synthesized in the following manner, and the resin particles 3 are resin particles synthesized in the following manner.

Preparation of Aqueous Dispersion Liquid of Resin Particles 2 (Tg of 80° C.)

An aqueous dispersion liquid of the resin particles 2 whose concentration of solid contents was 26.5% by mass was obtained in the same manner as the preparation of the aqueous dispersion liquid of the resin particles 1 except that the amount of each monomer to be charged was changed such that the copolymerization ratio [methyl methacrylate/isobornyl methacrylate/2-ethylhexyl methacrylate/methacrylic acid] in the copolymer was set to 42/11/37/10 [mass ratio], the weight-average molecular weight (Mw) was set to 35000, and the acid value was set to 65.1 (mgKOH/g).

The Tg of the resin particles 2 was 80° C., and the volume average particle diameter thereof was 10 nm.

Preparation of Aqueous Dispersion Liquid of Resin Particles 3 (Tg of 120° C.)

An aqueous dispersion liquid of the resin particles 3 whose concentration of solid contents was 26.5% by mass was obtained in the same manner as the preparation of the aqueous dispersion liquid of the resin particles 1 except that the amount of each monomer to be charged was changed such that the copolymerization ratio [methyl methacrylate/isobornyl methacrylate/2-ethylhexyl methacrylate/methacrylic acid] in the copolymer was set to 70/16/4/10 [mass ratio], the weight-average molecular weight (Mw) was set to 35000, and the acid value was set to 65.1 (mgKOH/g).

The Tg of the resin particles 3 was 120° C., and the volume average particle diameter thereof was 10 nm.

Preparation of Ink I

The ink as the second ink was prepared in the following manner.

Synthesis of Pigment Dispersion Resin 2

A pigment dispersion resin 2 was synthesized as described below.

The same mass of dipropylene glycol as the total amount of monomers described below was added to a three-neck flask equipped with a stiffer and a cooling pipe and heated to 85° C. in a nitrogen atmosphere.

A solution 1 obtained by mixing 9.1 molar equivalents of stearyl methacrylate, 34.0 molar equivalents of benzyl methacrylate, 31.9 molar equivalents of hydroxyethyl methacrylate, 25.0 molar equivalents of methacrylic acid, and 0.8 molar equivalents of 2-mercaptopropionic acid and a solution 2 obtained by dissolving 1% by mass of t-butylperoxy-2-ethylhexanoate (Perbutyl O, manufactured by NOF Corporation) with respect to the total amount of the monomers in 20% by mass of dipropylene glycol with respect to the total amount of the monomers were respectively prepared. The solution 1 was added dropwise to the three-neck flask for 4 hours, and the solution 2 was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance ($^1$H-NMR) method.

The obtained reaction solution was heated to 70° C., 20.0 molar equivalents of dimethylethanolamine was added thereto as an amine compound, propylene glycol was added thereto, and the resulting solution was stirred, thereby obtaining a 30 mass % solution of the pigment dispersion resin 2.

The constituent components of the obtained polymer were confirmed by $^1$H-NMR. Further, the weight-average molecular weight (Mw) determined by GPC was 22000.

Further, the mass ratio of respective constitutional units in the pigment dispersion resin 2 (constitutional unit derived from stearyl methacrylate/constitutional unit derived from benzyl methacrylate/constitutional unit derived from hydroxyethyl methacrylate/constitutional unit derived from methacrylic acid) was 20/39/27/14. Here, the mass ratio does not include the mass of dimethylaminoethanol.

Preparation of Pigment Dispersion Liquid W

A pigment dispersion liquid W was prepared in the following manner using a Lady Mill model LSG-4U-08 (manufactured by AIMEX Co., Ltd.).

45 parts by mass of titanium dioxide ($TiO_2$ particles; average primary particle diameter: 210 nm, trade name: PF-690, manufactured by Ishihara Sangyo Kaisha, Ltd.) particles as a white pigment (white inorganic pigment), 15 parts by mass of a 30 mass % solution of the pigment dispersion resin 2, and 40 parts by mass of ultrapure water were added to a zirconia container. Further, 40 parts by mass of 0.5 mmφ zirconia beads (Torayceram beads, manufactured by Toray Industries, Inc.) were added thereto and mixed gently using a spatula. The zirconia container containing the obtained mixture was placed in a ball mill, and the mixture was dispersed at a rotation speed of 1000 rpm for 5 hours. After completion of the dispersion, the beads were removed by filtration with a filter cloth, thereby obtaining a pigment dispersion liquid W having a $TiO_2$ concentration of 45% by mass.

Preparation of Ink I

An ink I having the following composition was prepared using the pigment dispersion liquid W, the aqueous dispersion liquid of the resin particles 3, 1,2-propanediol (PG; water-soluble organic solvent having a boiling point of lower than 220° C.), a surfactant (OLFINE (registered trademark) E1010, manufactured by Nissin Chemical Co., Ltd.), colloidal silica (SNOWTEX (registered trademark) XS (solid content of 20% by mass), manufactured by Nissan Chemical Corporation), and water.

Composition of Ink I

White pigment ($TiO_2$): 8% by mass
Pigment dispersion resin 2: 0.5% by mass
1,2-Propanediol (PG; water-soluble organic solvent having a boiling point of lower than 220° C.): 25% by mass
Surfactant (OLFINE (registered trademark) E1010, manufactured by Nissin Chemical Co., Ltd.): 1.2% by mass
Resin particles 3: 6% by mass
Colloidal silica (SNOWTEX (registered trademark) XS (silica solid content of 20% by mass), manufactured by Nissan Chemical Corporation): 0.06% by mass as silica solid content
Water: remaining amount set such that total amount of composition was 100% by mass Preparation of Inks J to M Each of inks J to M as the second ink was prepared in the same manner as the preparation of the ink I except that the composition of the ink was changed as listed in Table 1

TABLE 1

| | First ink | | | | | | | |
|---|---|---|---|---|---|---|---|---|
| | Ink A | Ink B | Ink C | Ink D | Ink E | Ink F | Ink G | Ink H |
| Cyan pigment | 4 | 4 | 4 | 4 | 4 | 4 | 4 | 4 |
| White pigment | | | | | | | | |
| Pigment dispersion resin 1 | 2 | 2 | 2 | 2 | 2 | 2 | 2 | 2 |
| Pigment dispersion resin 2 | | | | | | | | |
| PG (b.p. < 220° C.) | 25 | 25 | 25 | 25 | 25 | 25 | 15 | 25 |
| HDO (b.p. ≥ 220° C.) | | | 2 | 5.5 | | | | |
| OLFINE E1010 | 0.5 | 0.8 | 0.5 | 0.5 | 0.5 | 0.5 | 0.5 | 1.2 |
| Resin particles 1 (Tg = 100° C.) | 5 | 5 | 5 | 5 | | | 5 | 5 |
| Resin particles 2 (Tg = 80° C.) | | | | | 5 | | | |
| Resin particles 3 (Tg = 120° C.) | | | | | | 5 | | |
| SNOTEX XS | 0.06 | 0.06 | 0.06 | 0.06 | 0.06 | 0.06 | 0.06 | 0.06 |
| Water | Remaining amount | Remaining amount | Remaining amount | Remaining amount | Remaining amount | Remaining amount | Remaining amount | Remaining amount |

| | Second ink | | | | |
|---|---|---|---|---|---|
| | Ink I | Ink J | Ink K | Ink L | Ink M |
| Cyan pigment | | | | | |
| White pigment | 8 | 8 | 8 | 8 | 8 |
| Pigment dispersion resin 1 | | | | | |
| Pigment dispersion resin 2 | 0.5 | 0.5 | 0.5 | 0.5 | 0.5 |

TABLE 1-continued

|  | | | | | |
|---|---|---|---|---|---|
| PG (b.p. < 220° C.) | 25 | 25 | 25 | 25 | 25 |
| HDO (b.p. ≥ 220° C.) |  |  | 2 | 5.5 |  |
| OLFINE E1010 | 1.2 | 0.8 | 1.2 | 1.2 | 1.2 |
| Resin particles 1 (Tg = 100° C.) |  |  |  |  | 6 |
| Resin particles 2 (Tg = 80° C.) |  |  |  |  |  |
| Resin particles 3 (Tg = 120° C.) | 6 | 6 | 6 | 6 |  |
| SNOTEX XS | 0.06 | 0.06 | 0.06 | 0.06 | 0.06 |
| Water | Remaining amount | Remaining amount | Remaining amount | Remaining amount | Remaining amount |

(% by mass)

Examples 1 to 21 and Comparative Examples 1 to 8

The pretreatment liquid, the first ink, and the second ink were used in the combinations listed in Table 2, and the measurement, image recording, and evaluation described below were performed.

Measurement of Each Ink

The surface tension and the mixture viscosity A1 of the first inks (inks A to H) were measured by the method described above. Further, the Tg (° C.) of each of the first resins in the first inks (inks A to H) was acquired.

The surface tension and the mixture viscosity A2 of the second inks (inks I to M) were measured by the method described above. Further, the Tg (° C.) of each of the second resins in the second inks (inks I to M) was acquired.

The difference in surface tension (that is, the value obtained by subtracting the surface tension of the second ink from the surface tension of the first ink), the difference in mixture viscosity (A1−A2) (mPa·s), and the difference in Tg (Ta−Tb) (° C.) in each example were acquired based on the obtained results.

The above-described results are listed in Table 2.

Production of Image Recorded Material

A polyethylene terephthalate (PET) base material ("FE2001", manufactured by Futamura Chemical Co., Ltd., thickness of 12 μm, width of 540 mm, length of 4000 m) was prepared as an impermeable base material (hereinafter, also simply referred to as "base material") on which an image was recorded.

An image recording device including a transport mechanism for transporting a base material, and a wire bar coater for applying the pretreatment liquid, a first ink jet head for applying the first ink, and a second ink jet head for applying the second ink, which were arranged in this order from the upstream side of the base material in the transport direction was prepared.

As both the first ink jet head and the second ink jet head, 1200 dpi/20 inch-width piezo full line heads were used. Here, dpi is an abbreviation for dot per inch.

Both the first ink jet head and the second ink jet head were arranged such that the arrangement direction of nozzles was inclined by 75.7° with respect to a direction (that is, the width direction of the base material) orthogonal to the transport direction of the base material.

A liquid-repellent film containing a fluorine compound was provided on the ink jetting surface of each of the ink jet heads (that is, the first ink jet head and the second ink jet head). The liquid-repellent film containing a fluorine compound is a monolayer (SAM film) of $C_8F_{17}C_2H_4SiCl_3$.

An image was recorded by setting the base material, the pretreatment liquid, the first ink, and the second ink on the image recording device and applying the pretreatment liquid, the first ink, and the second ink onto the base material under a condition (that is, application disposition) in which an overlapping region formed such that a region where the pretreatment liquid was applied, a region where the first ink was applied, and a region where the second ink was applied overlapped each other in plan view was generated. In this manner, an image recorded material was obtained.

Hereinafter, the details will be described.

The pretreatment liquid was applied onto the base material using a wire bar coater while the base material was moved at a constant speed of 500 mm/sec. The applied amount of the pretreatment liquid was set to the amount (unit: g/m$^2$) listed in the columns of "applied amount of pretreatment liquid" in Table 2. The applied amount of the aggregating agent in the pretreatment liquid was set to the amount (unit: g/m$^2$) listed in the columns of "applied amount of aggregating agent" in Table 2.

The "applied amount of pretreatment liquid" (unit of g/m$^2$) is a value obtained by dividing the mass of the applied pretreatment liquid by the area of the region where the pretreatment liquid was applied.

The "applied amount of aggregating agent" (unit of g/m$^2$) is a value acquired based on the "applied amount of pretreatment liquid" (unit of g/m$^2$) and the content (% by mass) of the aggregating agent with respect to the total amount of the pretreatment liquid.

The drying of the pretreatment liquid was started at a site where the application of the pretreatment liquid was completed, under a temperature condition of 50° C. using a dryer 1.5 seconds after the completion of the application of the pretreatment liquid to the site, and the drying was completed 3.5 seconds after the completion of the application of the pretreatment liquid. The drying time here was 2 seconds.

While the base material after the pretreatment liquid was completely dried was allowed to move at a constant stage speed of 50 mm/sec, the first ink was jetted and applied onto the dried pretreatment liquid from the first ink jet head in the form of a solid image, and the second ink was jetted and applied onto the applied first ink from the second ink jet head in the form of a solid image. Here, the second ink was applied to the entire first ink applied onto the base material. That is, the overlapping regions in the group of the present examples and the group of the present comparative examples correspond to each of the region where the first ink was applied and the region where the second ink was applied.

Next, the first ink and the second ink were dried at 70° C. for 10 seconds.

As described above, a solid image having a laminated structure in which a white solid film formed of the second ink was laminated on a cyan solid film formed of the first ink was obtained. That is, an image recorded material including the base material and the solid image provided on the base material was obtained.

Here, both the first ink and the second ink were allowed to be jetted under the conditions of a jetting frequency of 24 kHz and a resolution of 1200 dpi×1200 dpi (dot per inch).

The liquid droplet amount of each of the first ink and the second ink in a case of jetting each of the first ink and the second ink was adjusted according to the applied amount of each of the first ink and the second ink. For example, in Example 1, the liquid droplet amount of the first ink was set to 3.0 pL (corresponding to 7.0 g/m² which was the applied amount of the first ink), and the liquid droplet amount of the second ink was set to 3.3 pL (corresponding to 7.8 g/m² which was the applied amount of the second ink).

Further, an ink which was degassed through a degassing filter and in which the temperature thereof was adjusted to 30° C. was used as each of the first ink and the second ink.

The applied amount of the first ink and the applied amount of the second ink were set as the amounts listed in the columns of "applied amount of first ink" and the columns of "applied amount of second ink" in Table 2 (unit of g/m²). The applied amount of the first resin and the applied amount of the second resin were set as the amounts listed in the columns of "applied amount of first resin" and the columns of "applied amount of second resin" in Table 2 (unit of g/m²).

The "applied amount of first ink" (unit of g/m²) is a value obtained by dividing the mass of the first ink applied to the overlapping region by the area of the overlapping region.

The "applied amount of first resin" (unit of g/m²) is a value acquired based on the "applied amount of first ink" (unit of g/m²) and the content (% by mass) of the first resin with respect to the total amount of the first ink.

The "applied amount of second ink" (unit of g/m²) is a value obtained by dividing the mass of the second ink applied to the overlapping region by the area of the overlapping region.

The "applied amount of second resin" (unit of g/m²) is a value acquired based on the "applied amount of second ink" (unit of g/m²) and the content (% by mass) of the second resin with respect to the total amount of the second ink.

The applied mass ratio [(first resin+second resin)/aggregating agent] (that is, the ratio of the total applied mass of the first resin and the second resin per unit area to the applied mass of the aggregating agent per unit area) was acquired based on the applied amount of the aggregating agent, the applied amount of the first resin, and the applied amount of the second resin.

The obtained applied mass ratio [(first resin+second resin)/aggregating agent] is listed in the columns of "applied amount ratio [resin/aggregating agent]" in Table 2.

Evaluation

The above-described image recorded materials were evaluated as follows.

Lamination Strength (L Strength)

A region having a length of 500 mm and a width of 500 mm (hereinafter, also referred to as a lamination strength evaluation region) in which the solid image was provided on the entire surface was cut out from the image recorded material obtained in the above-described manner and used as a lamination strength evaluation sample.

The solid image in the lamination strength evaluation sample was coated with an adhesive for dry lamination (main agent TM-320 (isocyanate compound)/curing agent CAT-13B (alcohol compound), manufactured by Toyo Morton, Ltd.) using a bar coater and dried at 70° C. for 10 seconds, and a cast polypropylene (CPP) film (trade name: PYLEN P1128, manufactured by Toyobo Co., Ltd., thickness of 25 µm) was superimposed thereon as the base material for lamination. In this state, the base material for lamination and the sample for evaluating the lamination strength were attached to each other, thereby obtaining a laminate.

The obtained laminate was aged at 40° C. for 48 hours.

A sample piece having a length of 100 mm and a width of 15 mm was cut out from the aged laminate.

Next, the base material for lamination and the sample for evaluating the lamination strength in a region from the one end in the longitudinal direction to a length of 30 mm in the sample piece were peeled by hand. The remaining region with a length of 70 mm was allowed to remain in a state where the base material for lamination and the sample for evaluating the lamination strength were attached to each other.

Next, a tensile test of stretching the peeled portion of the base material for lamination and the peeled portion of the sample for evaluating the lamination strength in opposite directions in the sample piece was performed. The stretching direction was a direction perpendicular to the above-described remaining region with a length of 70 mm (the remaining region in a state where the base material for lamination and the sample for evaluating the lamination strength were attached to each other).

The peel strength for peeling the base material for lamination and the sample for evaluating the lamination strength in the remaining region with a length of 70 mm was acquired by performing the tensile test, and the obtained peel strength was set as the lamination strength.

Based on the obtained lamination strength, the lamination strength between the sample for evaluating the lamination strength (that is, the image recorded material) and the base material for lamination was evaluated based on the following evaluation standards. In this manner, the lamination strength (hereinafter, also referred to as "L strength") between the image and the base material for lamination in the image recorded material was evaluated.

The results are listed in Table 2.

Further, the tensile test was performed using a tensile tester (TENSILON RTM-25, manufactured by Orientec Co., Ltd.).

Evaluation Standards for Lamination Strength (L Strength)

5: The lamination strength between the image recorded material and the base material for lamination was 2 N/15 mm or greater.

4: The lamination strength between the image recorded material and the base material for lamination was 1.5 N/15 mm or greater and less than 2 N/15 mm.

3: The lamination strength between the image recorded material and the base material for lamination was 1 N/15 mm or greater and less than 1.5 N/15 mm.

2: The lamination strength between the image recorded material and the base material for lamination was 0.5 N/15 mm or greater and less than 1 N/15 mm.

1: The lamination strength between the image recorded material and the base material for lamination was less than 0.5 N/15 mm.

Evaluation of Adhesiveness

The adhesiveness of the image was evaluated by attaching a piece tape of Cellotape (registered trademark, No. 405, manufactured by Nichiban Co., Ltd., width of 12 mm, hereinafter, also simply referred to as "tape") onto the solid image in the image recorded material obtained in the above-described manner and peeling the piece of tape off from the image.

Specifically, the tape was attached and peeled off according to the following method.

The tape was taken out at a constant speed and cut to have a length of approximately 75 mm, thereby obtaining a piece of tape.

The obtained piece of tape was superimposed on the solid image, and a region in the piece of tape at a center with a width of 12 mm and a length of 25 mm was attached onto the image using a finger and rubbed firmly with a fingertip.

An end of the piece of tape was grasped in 5 minutes after the piece of tape was attached onto the image and was peeled off from the image at an angle as close as possible to 60° for 0.5 to 1.0 seconds.

The presence or absence of adhesive matter on the piece of peeled tape and the presence or absence of peeling of the solid image on the recording medium were visually observed, and the adhesiveness of the image was evaluated according to the following evaluation standards.

The results are listed in Table 2.

In the following evaluation standards, a case where the adhesiveness is most excellent is ranked as "5".

Evaluation Standards for Adhesiveness

5: Adhesive matter was not found on the piece of tape, and peeling of the image on the recording medium was not found.

4: A small amount of colored adhesive matter was found on the piece of tape, but peeling of the image on the recording medium was not found.

3: A small amount of colored adhesive matter was found on the piece of tape, and slight peeling of the image on the recording medium was found, but it was in a practically acceptable range.

2: Colored adhesive matter was found on the piece of tape, peeling of the image on the recording medium was found, and it was out of a practically acceptable range.

1: Colored adhesive matter was found on the piece of tape, most of the image on the recording medium was peeled off, and the recording medium was visually recognized.

TABLE 2

|  | Pretreatment liquid | | | | First ink | | | | |
| --- | --- | --- | --- | --- | --- | --- | --- | --- | --- |
|  | Type | Applied amount of pretreatment liquid | Applied amount of aggregating agent | Tg of resin (° C.) | Type | Applied amount of first ink | Applied amount of first resin | Surface tension (mN/m) | High-boiling point solvent |
| Example 1 | PC1 | 1.5 | 0.0615 | 50 | A | 7.0 | 0.490 | 39.7 | 0% |
| Example 2 | PC1 | 1.5 | 0.0615 | 50 | A | 7.0 | 0.490 | 39.7 | 0% |
| Example 3 | PC1 | 1.5 | 0.0615 | 50 | A | 9.2 | 0.644 | 39.7 | 0% |
| Example 4 | PC1 | 1.5 | 0.0615 | 50 | A | 9.2 | 0.644 | 39.7 | 0% |
| Example 5 | PC1 | 1.5 | 0.0615 | 50 | A | 11.5 | 0.805 | 39.7 | 0% |
| Example 6 | PC1 | 1.5 | 0.0615 | 50 | A | 11.5 | 0.805 | 39.7 | 0% |
| Example 7 | PC1 | 1.2 | 0.0492 | 50 | A | 11.5 | 0.805 | 39.7 | 0% |
| Example 8 | PC1 | 1.8 | 0.0738 | 50 | A | 11.5 | 0.805 | 39.7 | 0% |
| Example 9 | PC1 | 1.5 | 0.0615 | 50 | A | 7.0 | 0.490 | 39.7 | 0% |
| Example 10 | PC1 | 1.5 | 0.0615 | 50 | B | 7.0 | 0.490 | 35.1 | 0% |
| Example 11 | PC2 | 1.5 | 0.0615 | 50 | A | 7.0 | 0.490 | 39.7 | 0% |
| Example 12 | PC2 | 1.5 | 0.0615 | 50 | A | 7.0 | 0.490 | 39.7 | 0% |
| Example 13 | PC1 | 1.5 | 0.0615 | 50 | C | 7.0 | 0.490 | 39.7 | 2% |
| Example 14 | PC1 | 1.5 | 0.0615 | 50 | D | 7.0 | 0.490 | 39.7 | 5.5% |
| Example 15 | PC1 | 1.5 | 0.0615 | 50 | A | 7.0 | 0.490 | 39.7 | 0% |
| Example 16 | PC1 | 1.5 | 0.0615 | 50 | A | 7.0 | 0.490 | 39.7 | 0% |
| Example 17 | PC1 | 1.5 | 0.0615 | 50 | E | 7.0 | 0.490 | 39.7 | 0% |
| Example 18 | PC1 | 1.5 | 0.0615 | 50 | F | 7.0 | 0.490 | 39.7 | 0% |
| Example 19 | PC1 | 1.5 | 0.0615 | 50 | G | 7.0 | 0.490 | 39.7 | 0% |
| Example 20 | PC3 | 1.5 | 0.0615 | No resin | A | 7.0 | 0.490 | 39.7 | 0% |
| Example 21 | PC3 | 1.5 | 0.0615 | A | 11.5 | 0.805 | 39.7 | 0% |
| Comparative Example 1 | PC1 | 1.5 | 0.0615 | 50 | A | 6.5 | 0.455 | 39.7 | 0% |
| Comparative Example 2 | PC1 | 1.5 | 0.0615 | 50 | A | 12.2 | 0.854 | 39.7 | 0% |
| Comparative Example 3 | PC1 | 1.5 | 0.0615 | 50 | B | 7.0 | 0.490 | 35.1 | 0% |
| Comparative Example 4 | PC1 | 1.5 | 0.0615 | 50 | H | 7.0 | 0.490 | 32.5 | 0% |
| Comparative Example 5 | PC1 | 0.8 | 0.0328 | 50 | A | 7.0 | 0.490 | 39.7 | 0% |
| Comparative Example 6 | PC1 | 1.8 | 0.0738 | 50 | A | 7.0 | 0.490 | 39.7 | 0% |

TABLE 2-continued

| | | | | | | | | | |
|---|---|---|---|---|---|---|---|---|---|
| Comparative Example 7 | PC2 | 1.5 | 0.0615 | 50 | A | 6.5 | 0.455 | 39.7 | 0% |
| Comparative Example 8 | PC2 | 1.5 | 0.0615 | 50 | A | 12.2 | 0.854 | 39.7 | 0% |

| | First ink | | Second ink | | | | | | |
|---|---|---|---|---|---|---|---|---|---|
| | Tg of resin particle (° C.) | Viscosity A1 (mPa·s) | Type | Applied amount of second ink | Applied amount of Second resin | Surface tension (mN/m) | High-boiling point solvent | Tg of resin particle (° C.) | Viscosity A2 (mPa·s) |
| Example 1 | 100 | 140 | I | 7.8 | 0.507 | 32.5 | 0% | 120 | 110 |
| Example 2 | 100 | 140 | I | 15.8 | 1.027 | 32.5 | 0% | 120 | 110 |
| Example 3 | 100 | 140 | I | 7.8 | 0.507 | 32.5 | 0% | 120 | 110 |
| Example 4 | 100 | 140 | I | 15.8 | 1.027 | 32.5 | 0% | 120 | 110 |
| Example 5 | 100 | 140 | I | 7.8 | 0.507 | 32.5 | 0% | 120 | 110 |
| Example 6 | 100 | 140 | I | 15.8 | 1.027 | 32.5 | 0% | 120 | 110 |
| Example 7 | 100 | 140 | I | 7.8 | 0.507 | 32.5 | 0% | 120 | 110 |
| Example 8 | 100 | 140 | I | 7.8 | 0.507 | 32.5 | 0% | 120 | 110 |
| Example 9 | 100 | 140 | J | 7.8 | 0.507 | 35.1 | 0% | 120 | 110 |
| Example 10 | 100 | 140 | I | 7.8 | 0.507 | 32.5 | 0% | 120 | 110 |
| Example 11 | 100 | 140 | I | 7.8 | 0.507 | 32.5 | 0% | 120 | 110 |
| Example 12 | 100 | 140 | I | 15.8 | 1.027 | 32.5 | 0% | 120 | 110 |
| Example 13 | 100 | 140 | I | 7.8 | 0.507 | 32.5 | 0% | 120 | 110 |
| Example 14 | 100 | 140 | I | 7.8 | 0.507 | 32.5 | 0% | 120 | 110 |
| Example 15 | 100 | 140 | K | 7.8 | 0.507 | 32.5 | 2% | 120 | 110 |
| Example 16 | 100 | 140 | L | 7.8 | 0.507 | 32.5 | 5.5% | 120 | 110 |
| Example 17 | 80 | 140 | I | 7.8 | 0.507 | 32.5 | 0% | 120 | 110 |
| Example 18 | 120 | 140 | M | 7.8 | 0.507 | 32.5 | 0% | 100 | 110 |
| Example 19 | 100 | 100 | I | 7.8 | 0.507 | 32.5 | 0% | 120 | 110 |
| Example 20 | 100 | 140 | I | 7.8 | 0.507 | 32.5 | 0% | 120 | 110 |
| Example 21 | 100 | 140 | I | 7.8 | 0.507 | 32.5 | 0% | 120 | 110 |
| Comparative Example 1 | 100 | 140 | I | 7.8 | 0.507 | 32.5 | 0% | 120 | 110 |
| Comparative Example 2 | 100 | 140 | I | 15.8 | 1.027 | 32.5 | 0% | 120 | 110 |
| Comparative Example 3 | 100 | 140 | J | 7.8 | 0.507 | 35.1 | 0% | 120 | 110 |
| Comparative Example 4 | 100 | 140 | J | 7.8 | 0.507 | 35.1 | 0% | 120 | 110 |
| Comparative Example 5 | 100 | 140 | I | 7.8 | 0.507 | 32.5 | 0% | 120 | 110 |
| Comparative Example 6 | 100 | 140 | I | 7.8 | 0.507 | 32.5 | 0% | 120 | 110 |
| Comparative Example 7 | 100 | 140 | I | 7.8 | 0.507 | 32.5 | 0% | 120 | 110 |
| Comparative Example 8 | 100 | 140 | I | 15.8 | 1.027 | 32.5 | 0% | 120 | 110 |

| | Difference in surface tension (mN/m) | Applied amount ratio [resin/aggregating agent] | Ta-Tb (° C.) | A1-A2 (mPa·s) | Evaluation | |
|---|---|---|---|---|---|---|
| | | | | | L strength | Adhesiveness |
| Example 1 | 7.2 | 16.2 | 20 | 30 | 5 | 5 |
| Example 2 | 7.2 | 24.7 | 20 | 30 | 4 | 4 |
| Example 3 | 7.2 | 18.7 | −20 | 30 | 4 | 5 |
| Example 4 | 7.2 | 27.2 | 20 | 30 | 3 | 3 |
| Example 5 | 7.2 | 21.3 | −20 | 30 | 4 | 5 |
| Example 6 | 7.2 | 29.8 | 20 | 30 | 3 | 3 |
| Example 7 | 7.2 | 26.7 | −20 | 30 | 3 | 3 |
| Example 8 | 7.2 | 17.8 | −20 | 30 | 4 | 5 |
| Example 9 | 4.6 | 16.2 | 20 | 30 | 5 | 5 |
| Example 10 | 2.6 | 16.2 | 20 | 30 | 4 | 5 |
| Example 11 | 7.2 | 16.2 | 20 | 30 | 5 | 5 |
| Example 12 | 7.2 | 24.7 | 20 | 30 | 4 | 4 |
| Example 13 | 7.2 | 16.2 | 20 | 30 | 4 | 4 |
| Example 14 | 7.2 | 16.2 | 20 | 30 | 3 | 3 |
| Example 15 | 7.2 | 16.2 | 20 | 30 | 4 | 4 |
| Example 16 | 7.2 | 16.2 | 20 | 30 | 3 | 3 |
| Example 17 | 7.2 | 16.2 | 40 | 30 | 4 | 4 |
| Example 18 | 7.2 | 16.2 | −20 | 30 | 4 | 4 |
| Example 19 | 7.2 | 16.2 | 20 | −10 | 4 | 5 |

TABLE 2-continued

|  |  |  |  |  |  |  |
|---|---|---|---|---|---|---|
| Example 20 | 7.2 | 16.2 | 20 | 30 | 4 | 4 |
| Example 21 | 7.2 | 21.3 | −20 | 30 | 3 | 4 |
| Comparative Example 1 | 7.2 | 15.6 | 20 | 30 | 1 | 4 |
| Comparative Example 2 | 7.2 | 30.6 | 20 | 30 | 1 | 1 |
| Comparative Example 3 | 0 | 16.2 | 20 | 30 | 1 | 4 |
| Comparative Example 4 | −2.6 | 16.2 | 20 | 30 | 1 | 4 |
| Comparative Example 5 | 7.2 | 30.4 | 20 | 30 | 1 | 1 |
| Comparative Example 6 | 7.2 | 13.5 | 20 | 30 | 1 | 4 |
| Comparative Example 7 | 7.2 | 15.6 | 20 | 30 | 1 | 4 |
| Comparative Example 8 | 7.2 | 30.6 | 20 | 30 | 1 | 1 |

Explanation of Table 2

All the applied amount of the pretreatment liquid, the applied amount of the aggregating agent, the applied amount of the first ink, the applied amount of the first resin, and the applied amount of the second ink are in units of g/m$^2$.

The amount (%) of the high-boiling point solvent in the first ink denotes the content (% by mass) of the high-boiling point solvent (specifically, 1,2-hexanediol (HDO)) with respect to the total amount of the first ink, and the amount (%) of the high-boiling point solvent (specifically, 1,2-hexanediol (HDO)) in the second ink denotes the content (% by mass) of the high-boiling point solvent with respect to the total amount of the second ink.

The difference in surface tension denotes a value obtained by subtracting the surface tension of the second ink from the surface tension of the first ink.

The applied amount ratio [resin/aggregating agent] denotes the applied mass ratio [(first resin+second resin)/aggregating agent] (that is, the ratio of the total applied mass of the first resin and the second resin per unit area with respect to the applied mass of the aggregating agent per unit area).

The difference Ta–Tb is a value obtained by subtracting Tb from Ta in a case where the glass transition temperature of the resin particles with a greater applied mass per unit area is defined as Ta and the glass transition temperature of the resin particles with a smaller applied mass per unit area is defined as Tb in the overlapping region between the resin particles contained in the first resin and the resin particles contained in the second resin.

The difference A1–A2 is a value obtained by subtracting A2 from A1 in a case where the viscosity of the mixture obtained by mixing the pretreatment liquid and the first ink is defined as A1 and the viscosity of the mixture obtained by mixing the pretreatment liquid and the second ink is defined as A2. The method of measuring the difference A1–A2 is as described above.

As listed in Table 2, the image recorded materials of Examples 1 to 21 which were obtained by applying the pretreatment liquid, the first ink, and the second ink under the condition that the applied amount ratio [resin/aggregating agent] was 16.0 or greater and 30.0 or less using the first ink and the second ink in which the difference in surface tension (that is, a value obtained by subtracting the surface tension of the second ink from the surface tension of the first ink) was greater than 0 mN/m each had excellent lamination strength (L strength) and excellent adhesiveness of the image.

On the contrary, the image recorded materials of Comparative Examples 1, 6, and 7 which were produced under the condition that the applied amount ratio [resin/aggregating agent] was less than 16.0 had excellent adhesiveness of the image, but had a decreased lamination strength. The reason for this is considered to be that the unevenness of the surface of the image and/or the variation in thickness of the image occurred due to the overaggregation of the resin.

Further, the image recorded materials of Comparative Examples 2, 5, and 8 which were produced under the condition that the applied amount ratio [resin/aggregating agent] was greater than 30.0 had decreased adhesiveness and decreased lamination strength. The reason for this is considered to be that the adhesiveness of the image, which was the base of the lamination strength, was decreased due to insufficient aggregation of the resin.

Further, the image recorded materials of Comparative Examples 3 and 4 which were produced using the first ink and the second ink having a surface tension difference of 0 mN/m or less had excellent adhesiveness of the image, but had a decreased lamination strength. The reason for this is considered to be that the unevenness of the surface of the image and/or the variation in thickness of the image occurred due to insufficient spread of the second ink.

Among Examples 1, 2, 6, and 7, in Examples 1 and 2 in which the applied amount ratio [resin/aggregating agent] was 16.0 or greater and 25.0 or less, the lamination strength and the adhesiveness of the image were more excellent.

Among Examples 1, 13, and 14, in Example 1 in which the first ink did not contain a high-boiling point solvent (that is, an organic solvent having a boiling point (b.p.) of 220° C. or higher) and Example 13 in which the first ink contained a high-boiling point solvent and the content of the high-boiling point solvent was 5% by mass or less, the lamination strength and the adhesiveness were more excellent.

Among Examples 1, 15, and 16, in Example 1 in which the second ink did not contain a high-boiling point solvent (that is, an organic solvent having a boiling point of 220° C. or higher) and Example 15 in which the second ink contained a high-boiling point solvent and the content of the high-boiling point solvent was 5% by mass or less, the lamination strength and the adhesiveness were more excellent.

Based on the comparison of Example 1 and Example 20, the lamination strength and the adhesiveness were more excellent in Example 1 in which the pretreatment liquid contained a resin and the Tg of the resin contained in the pretreatment liquid was less than the Tg of the resin particles in the first resin as compared with Example 20 in which the pretreatment liquid did not contain a resin.

Based on the comparison of Example 5 and Example 21, the lamination strength and the adhesiveness were more excellent in Example 5 in which the pretreatment liquid contained a resin and the Tg of the resin contained in the pretreatment liquid was less than the Tg of the resin particles in the first resin.

Between Examples 1 and 18, the lamination strength and the adhesiveness were more excellent in Example 1 in which the relationship of 0° C.≤Ta−Tb≤30° C. was satisfied.

Between Examples 1 and 19, the lamination strength was more excellent in Example 1 in which the relationship of A1−A2>0 mPa·s was satisfied.

Hereinbefore, the group of the examples in which the cyan ink was as the first ink and the white ink was used as the second ink has been described above, but the present disclosure is not limited to the group of the examples.

For example, it goes without saying that the same effects as those of the above-described group of the examples can be obtained in a case where the first ink was changed to an ink other than the cyan ink (such as a magenta ink, a yellow ink, or a black ink), a case where a polychromic image was recorded using the cyan ink and at least one ink other than the cyan ink as the first ink, and a case where at least one ink other than the white ink was used as the second ink in the above-described group of the examples.

What is claimed is:

1. A method of producing an image recorded material, comprising:
    preparing a pretreatment liquid containing: at least one aggregating agent selected from the group consisting of an organic acid, an organic acid salt, a polyvalent metal compound, and a metal complex; a resin; and water;
    preparing a first ink containing a first pigment, a first resin, and water;
    preparing a second ink containing a second pigment, a second resin, and water and having a surface tension less than a surface tension of the first ink; and
    an image recording of sequentially applying the pretreatment liquid, the first ink, and the second ink onto an impermeable base material to record an image,
    wherein in the image recording, the image is recorded under a condition in which an overlapping region formed such that a region where the pretreatment liquid is applied, a region where the first ink is applied, and a region where the second ink is applied overlap each other in plan view is generated and in which a ratio of a total applied mass of the first resin and the second resin per unit area to an applied mass of the aggregating agent per unit area in the overlapping region is 16.0 or greater and 25.0 or less,
    wherein, in a case of the first ink, a content of an organic solvent having a boiling point of 220° C. or higher is 5% by mass or less with respect to a total amount of the first ink, and
    in a case of the second ink, a content of the organic solvent having a boiling point of 220° C. or higher is 5% by mass or less with respect to a total amount of the second ink.

2. The method of producing an image recorded material according to claim 1,
    wherein the first resin contains resin particles, and
    the resin contained in the pretreatment liquid has a glass transition temperature lower than a glass transition temperature of the resin particles contained in the first resin.

3. The method of producing an image recorded material according to claim 1,
    wherein the first resin contains resin particles,
    the second resin contains resin particles, and
    in a case where among the resin particles contained in the first resin and the resin particles contained in the second resin, in the overlapping region, a glass transition temperature of the resin particles with a greater applied mass per unit area is defined as Ta and a glass transition temperature of the resin particles with a smaller applied mass per unit area is defined as Tb, Ta and Tb satisfy a relationship of 0° C.≤ Ta−Tb≤ 30° C.

4. The method of producing an image recorded material according to claim 1,
    wherein in a case where a viscosity of a mixture obtained by mixing the pretreatment liquid and the first ink is defined as A1 and a viscosity of a mixture obtained by mixing the pretreatment liquid and the second ink is defined as A2, A1 and A2 satisfy a relationship of A1−A2>0 mPa·s.

5. A method of producing a laminate, comprising:
    obtaining an image recorded material by the method of producing an image recorded material according to claim 1; and
    laminating a base material for lamination on a side where the image of the image recorded material is recorded to obtain a laminate.

6. An image recorded material comprising:
    an impermeable base material; and
    an image recorded on the impermeable base material,
    wherein the image includes a pretreatment layer that is in contact with the impermeable base material and contains an aggregating agent and a resin, a first layer that is in contact with the pretreatment layer and contains a first pigment and a first resin, and a second layer that is in contact with the first layer and contains a second pigment and a second resin and also includes an overlapping region where the pretreatment layer, the first layer, and the second layer overlap each other in plan view,
    wherein the first layer is formed from a first ink comprising a content of an organic solvent having a boiling point of 220° C. or higher of 5% by mass or less with respect to a total amount of the first ink,
    wherein the second layer is formed from a second ink comprising a content of an organic solvent having a boiling point of 220° C. or higher of 5% by mass or less with respect to a total amount of the second ink,
    the aggregating agent is at least one selected from the group consisting of an organic acid, an organic acid salt, a polyvalent metal compound, and a metal complex, and
    a ratio of a total mass of the first resin and the second resin per unit area to a mass of the aggregating agent per unit area in the overlapping region is 16.0 or greater and 25.0 or less.

7. A laminate comprising:
    the image recorded material according to claim 6; and
    a base material for lamination which is laminated on the image of the image recorded material.

* * * * *